US012579933B1

(12) United States Patent
Chen et al.

(10) Patent No.: US 12,579,933 B1
(45) Date of Patent: Mar. 17, 2026

(54) MULTISTABLE DISPLAY DRIVEN BY DYNAMIC DISPLAY SCHEME

(71) Applicant: GENETOUCH CORP., Taoyuan City (TW)

(72) Inventors: Cheng Yu Chen, Taoyuan City (TW); Ching Lung Li, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/206,552

(22) Filed: May 13, 2025

(30) Foreign Application Priority Data

Apr. 1, 2025 (TW) ................................ 114112629

(51) Int. Cl.
*G09G 3/32* (2016.01)

(52) U.S. Cl.
CPC ....... *G09G 3/32* (2013.01); *G09G 2310/0259* (2013.01); *G09G 2310/061* (2013.01); *G09G 2310/08* (2013.01)

(58) Field of Classification Search
CPC ..... G09G 2310/0259; G09G 2310/061; G09G 2310/08; G09G 3/32
See application file for complete search history.

(56) References Cited

U.S. PATENT DOCUMENTS

| | | | | |
|---|---|---|---|---|
| 2011/0310068 | A1* | 12/2011 | Nose .................... | G09G 3/3629 345/204 |
| 2023/0335072 | A1* | 10/2023 | Yao ......................... | G02F 1/137 |

FOREIGN PATENT DOCUMENTS

| | | | | | |
|---|---|---|---|---|---|
| CN | 101390148 | A | * 3/2009 | ............. | G09G 3/344 |
| JP | 2012053210 | A | * 3/2012 | ........... | G09G 3/3629 |
| TW | 201340083 | A | * 10/2013 | ........... | G09G 3/3629 |
| WO | WO-2025213634 | A1 | * 10/2025 | ............... | G09G 3/36 |

* cited by examiner

*Primary Examiner* — Ricardo Osorio
(74) *Attorney, Agent, or Firm* — WPAT, PC

(57) ABSTRACT

A multistable display driven by dynamic display scheme includes a time controller circuit unit, a driver circuit unit, and a screen unit. The time controller circuit unit generates a time controller signal, and a data signal included in the time controller signal further includes a pixel dynamic display header data and a pixel dynamic display waveform data. The driver circuit unit determines a pixel display voltage value of a pixel display driver signal according to the pixel dynamic display header data. The driver circuit unit also determines a pixel display driving time duration according to the half duty count and the pixel dynamic display waveform data, and the driver circuit unit outputs the pixel display driver signal with the pixel display voltage value to the screen unit for the pixel display driving time duration. The multistable display may be driven at a low clock rate to decrease power consumption.

16 Claims, 21 Drawing Sheets

MULTISTABLE DISPLAY DRIVEN BY DYNAMIC DISPLAY SCHEME

CROSS-REFERENCE TO RELATED APPLICATION(S)

This application claims the priority benefit of TW application serial No. 114112629 filed on Apr. 1, 2025, the entirety of which is hereby incorporated by reference herein and made a part of the specification.

BACKGROUND OF THE INVENTION

1. Field of the Invention

The present invention relates to a display, more particularly a multistable display driven by dynamic display scheme (DDS) with a low clock rate.

2. Description of the Related Art

A conventional multistable display, such as a cholesteric liquid crystal display (ChLCD), has liquid crystals with bistable displaying properties. As such, various sets of different voltages are required to drive the conventional multistable display for displaying a frame. For example, the conventional multistable display includes a screen unit, and each pixel on the screen unit is intersected by a plurality of line electrodes and a plurality of pixel electrodes Furthermore, in the screen unit, a liquid crystal layer is mounted between the line electrodes and the pixel electrodes. When driving the screen unit, voltages are applied to the line electrodes and the pixel electrodes, thus configuring a location corresponding to a pixel to have a specific voltage difference across the liquid crystal layer, and allowing the liquid crystal within the liquid crystal layer to correspondingly rotate to a specific angle.

As various sets of different voltages are required to drive the conventional multistable display, a control signal of the conventional multistable display, however, requires a plurality of bits to transport control data that dictates the various sets of different voltages required for each of the pixels. In other words, the control signal of the conventional multistable display cannot simply use one single bit to represent the various sets of different voltages required for each of the pixels. For example, conventionally, the control data used for dictating the various sets of different voltages required for each of the pixels is transported in 3 bits. This means that, each time the various sets of different voltages required for one pixel is modified, 3 bits of the control data need to be transported.

The conventional multistable display further includes a time controller circuit unit (TCON) and a driver circuit unit (driver IC). The time controller circuit unit is configured to generate a time controller signal to the driver circuit unit. The driver circuit unit is configured to generate pixel driving signals to the line electrodes and the pixel electrodes according to the time controller signal, thus driving the conventional multistable display to display a frame.

The time controller circuit unit, conventionally, includes a clock signal output port (clk), a display output enable control port (doe), a display output ground control port (dog), a digital to analog control port (d2*a*), a display start pulse control port (dsp), and a plurality of data output ports (data). The clock signal output port (clk), the display output enable control port (doe), the display output ground control port (dog), the digital to analog control port (d2*a*), the display start pulse control port (dsp), and the data output ports (data) are connected to the driver circuit unit (driver IC) for transporting the control signal. Particularly, a frequency of a clock signal outputted from the clock signal output port (clk) greatly affects an overall power consumption of the conventional multistable display, i.e. the higher the frequency of the clock signal, the greater the overall power consumption of the conventional multistable display would be.

For example, for the conventional multistable display with Full HD resolution of 1920×1080, when using single data rate (SDR) for transporting the control signal, each cycle of the clock signal is able to include and transport control data for 2 pixels, thus in other words, the pixel per clock is 2. Furthermore, a transportation time ($T_{line}$) is configured to be 5 milliseconds (ms). The control data corresponding to each of the pixels is transported in 3 bits. Overall, as the control data corresponding to each of the pixels requires 3 bits transportation, and as the pixel per clock is 2, a number of the data output ports (data) equals to a number of bits required for each pixel multiplied by a number of pixels per clock, hence 3×2=6, in other words, the number of the data output ports (data) is 6.

Moreover, for each of the pixels, within a frame, various sets of different voltages are still required to modify voltage waveforms used for driving the liquid crystals. For example, a plurality of duties is required to display a frame, and a number of duties required to display the frame is a duty count. The duty count may be modified as desired; for example, the duty count may be configured to be 64. The duty count is usually configured in different powers of 2. Whenever each duty requires different sets of voltages for driving, 3 bits of control data need to be sent for each duty, hence, for an abundance of duty counts, an abundance of bits would need to be sent for each frame.

The frequency of the clock signal, or a clock rate of the conventional multistable display may be calculated with the following formula:

$$\text{clock rate (Hz)} = \left[\frac{\text{(resolution)}}{\text{(piexl per clock)}} + \text{(hold time)}\right] \times \frac{\text{(duty count)}}{(T_{line})}$$

More particularly, when the resolution is 1920, the pixel per clock under SDR is 2, the hold time is configured as 1, the duty count is configured as 64, the transportation time ($T_{line}$) is configured as 5 ms, and the clock rate is obtained as shown in the following Table 1:

TABLE 1

| Resolution | Mode | Pixel per clock | Duty count | $T_{line}$ | Clock rate |
|---|---|---|---|---|---|
| Full HD (1920 × 1080) | SDR | 2 | 64 | 5(ms) | 12.314(MHz) |

As described earlier and in Table 1, when under Full HD resolution, the clock rate and the duty count are correlated. By having high clock rates, the conventional multistable display consumes a great amount of power, hence, the conventional multistable display consumes too much power with its high clock rates.

SUMMARY OF THE INVENTION

As most conventional multistable displays consume too much power with high clock rates, the present invention provides a multistable display driven by dynamic display scheme (DDS) with a lower clock rate. As a result, the multistable display driven by DDS of the present invention is able to decrease power consumption.

The multistable display driven by DDS includes a time controller circuit unit (TCON), a driver circuit unit (driver IC), and a screen unit.

The time controller circuit unit generates a time controller signal. The driver circuit unit is connected to the time controller circuit unit, and the driver circuit unit receives the time controller signal. The screen unit is connected to the driver circuit unit.

The time controller signal includes a data signal, and the data signal includes a pixel dynamic display header data and a pixel dynamic display waveform data. The driver circuit unit determines a pixel display voltage value of a pixel display driver signal according to the pixel dynamic display header data. The driver circuit unit also stores a half duty count. The driver circuit unit determines a pixel display driving time duration according to the half duty count and the pixel dynamic display waveform data, and the driver circuit unit outputs the pixel display driver signal with the pixel display voltage value to the screen unit for the pixel display driving time duration.

As the driver circuit unit determines the pixel display voltage value of the pixel display driver signal according to the pixel dynamic display header data, and as the driver circuit unit determines the pixel display driving time duration for outputting the pixel display driver signal with the pixel display voltage value to the screen unit according to the half duty count and the pixel dynamic display waveform data, the driver circuit unit is able to configure an entire waveform of the pixel display driver signal for each pixel electrode merely according to the pixel dynamic display header data and the pixel dynamic display waveform data. In other words, the driver circuit unit avoids needing to resupply new voltage values for configuring a voltage waveform when adjusting the voltage waveform for driving the screen unit. As such, a clock rate and a duty count for driving the screen unit are no longer correlated for the present invention. The present invention may therefore drastically decrease an amount of bits needed to transport and drive the screen unit. In comparison to a conventional multistable display, under a same condition of transporting a same amount of bits within a same time frame, the present invention is able to drive the screen unit with a lower clock rate, thus decreasing a power consumption needed for driving the screen unit.

DETAILED DESCRIPTION OF THE INVENTION

Figure 1:
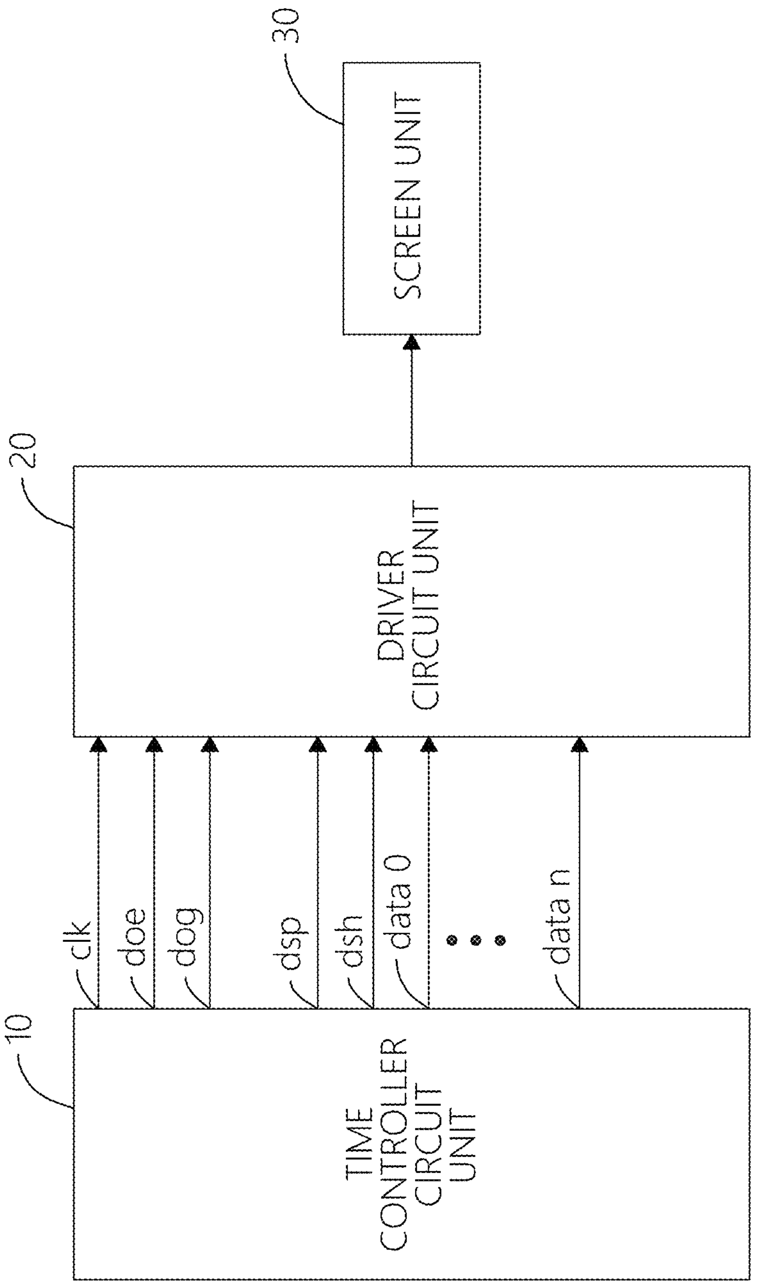
FIG. 1 is a block diagram of a multistable display driven by dynamic display scheme (DDS) of the present invention.

With reference to FIG. 1, a multistable display driven by dynamic display scheme (DDS) includes a time controller circuit unit 10, a driver circuit unit 20, and a screen unit 30.

The time controller circuit unit 10 generates a time controller signal. The driver circuit unit 20 is connected to the time controller circuit unit 10, and the driver circuit unit 20 receives the time controller signal. The screen unit 30 is connected to the driver circuit unit 20.

Figure 2:
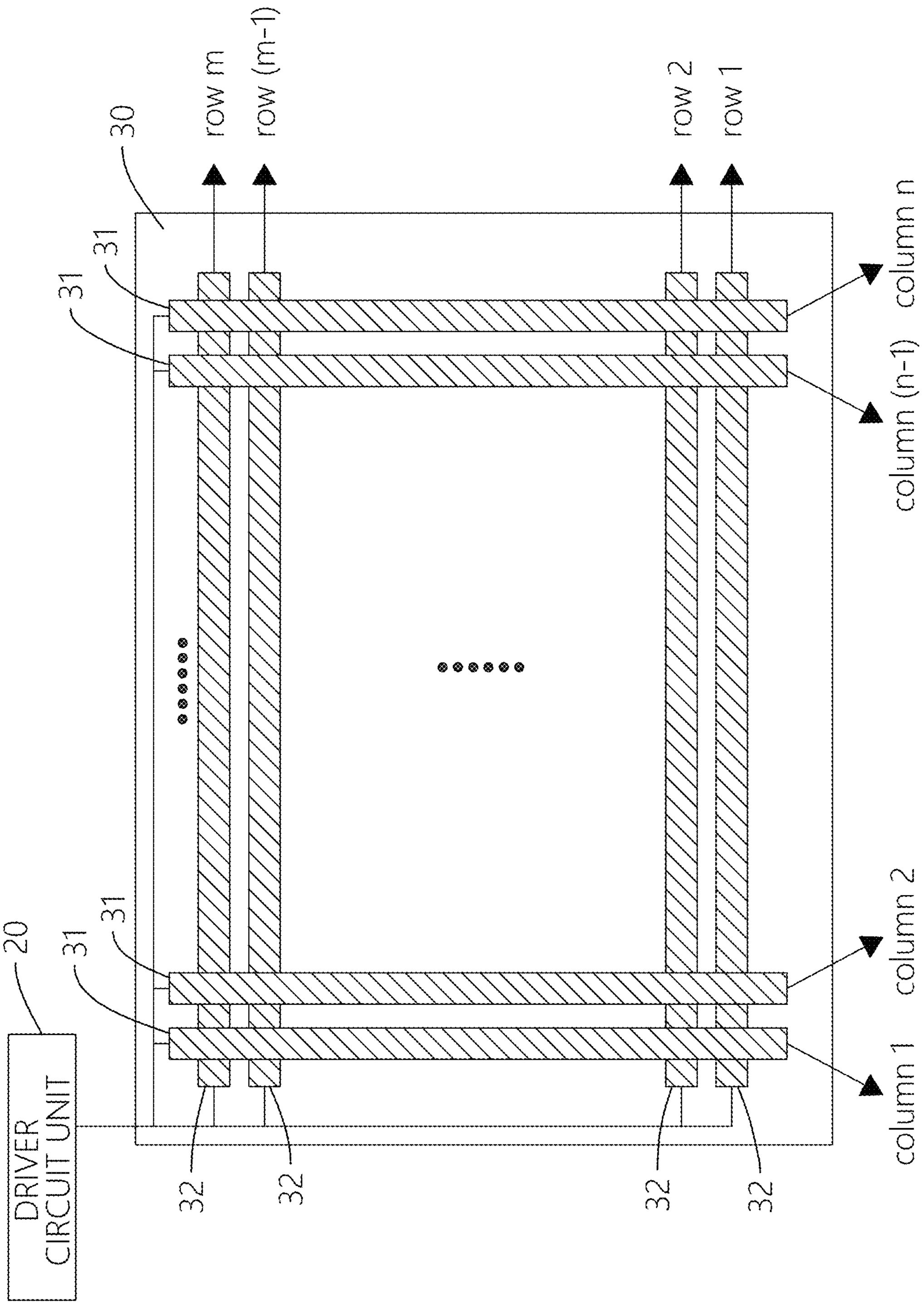
FIG. 2 is a perspective view of electrode structures of a screen unit of the multistable display of the present invention.

With reference to FIG. 2, FIG. 2 presents a structural perspective view of the screen unit 30. The screen unit 30 is a passive matrix constructed by vertical and horizontal intersections of a plurality of pixel electrodes 31 (from column 1 to column n) and a plurality of line electrodes 32 (from row 1 to row m). Each intersection of the pixel electrodes 31 and the line electrodes 32 forms a pixel. In other words, each pixel corresponds to one of the pixel electrodes 31 and one of the line electrodes 32. In FIG. 2, the display unit 30 includes n counts of pixel electrodes 31 and m counts of line electrodes 32, wherein n and m are positive integers greater than one. The driver circuit unit 20 drives the display unit 30 by outputting pixel driving signals to the pixel electrodes 31 and outputting line driving signals to the line electrodes 32. For example, the driver circuit unit 20 may respectively output the pixel driving signals to the pixel electrodes 31 and the line driving signals to the line electrodes 32 by scanning.

Figure 3A:
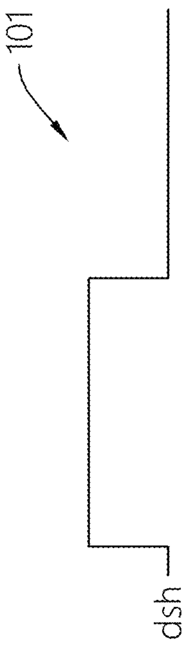
FIG. 3A is a waveform perspective view of a header configuration signal outputted by a header configuration control port (dsh) in a first embodiment of the multistable display of the present invention.
Figure 3B:
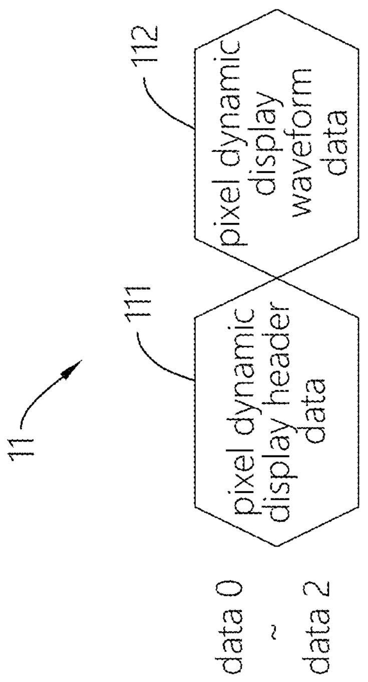
FIG. 3B is a perspective view of a data signal outputted by at least one data signal output port in the first embodiment of the multistable display of the present invention.

With references to FIGS. 3A and 3B, the time controller signal includes a data signal 11, and the data signal 11 includes a pixel dynamic display header data 111 and a pixel dynamic display waveform data 112. The driver circuit unit 20 determines a pixel display voltage value of a pixel display driver signal according to the pixel dynamic display header data 111. The driver circuit unit also stores a half duty count as a default number. In an embodiment, the driver circuit unit 20 further calculates a duty count as the half duty count multiplied by 2. The driver circuit unit 20 determines a pixel display driving time duration according to the half duty count and the pixel dynamic display waveform data 112. In the present embodiment, the pixel display driver signal is the pixel driving signals outputted from the driver circuit unit 20 to the pixel electrodes 31.

As the driver circuit unit 20 determines the pixel display voltage value of the pixel display driver signal according to the pixel dynamic display header data 111, and as the driver circuit unit 20 determines the pixel display driving time duration for outputting the pixel display driver signal with the pixel display voltage value according to the half duty count and the pixel dynamic display waveform data 112, the driver circuit unit 20 is able to configure an entire waveform of the pixel display driver signal for each of the pixel electrodes 31 merely according to the pixel dynamic display header data 111 and the pixel dynamic display waveform data 112. In other words, the driver circuit unit 20 avoids needing to re-supply new voltage values for configuring a voltage waveform when adjusting the voltage waveform for driving the screen unit 30. As such, a clock rate and a duty count for driving the screen unit 30 are no longer correlated for the present invention. The present invention may therefore drastically decrease an amount of bits needed to transport and drive the screen unit 30. In comparison to a conventional multistable display, under a same condition of transporting a same amount of bits within a same time frame, the present invention is able to drive the screen unit 30 with a lower clock rate, thus decreasing a power consumption needed for driving the screen unit 30.

Figure 4A:
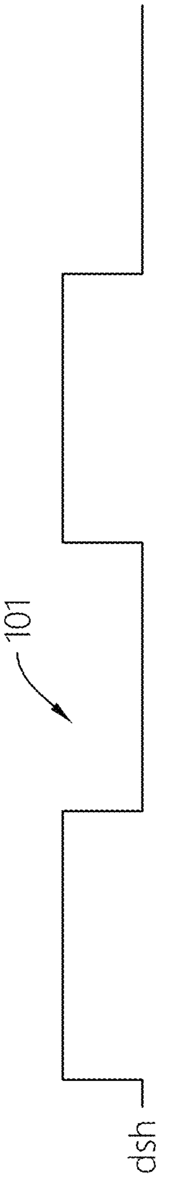
FIG. 4A is a waveform perspective view of the header configuration signal outputted by the header configuration control port (dsh) in a second embodiment of the multistable display of the present invention.
Figure 4B:
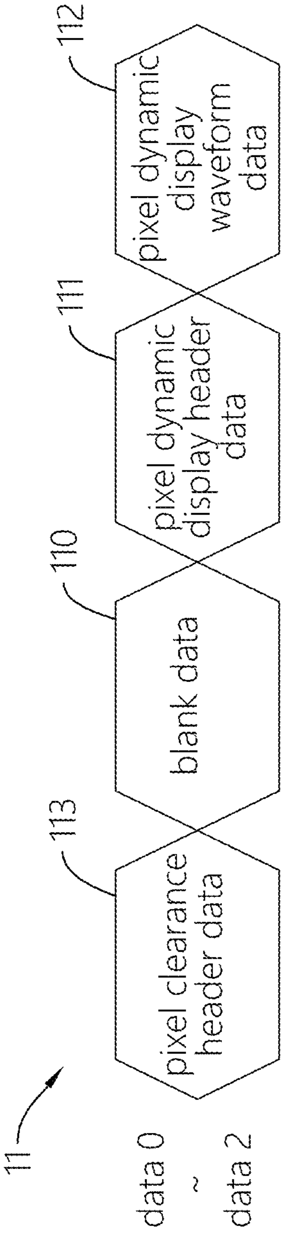
FIG. 4B is a perspective view of the data signal outputted by the at least one data signal output port in the second embodiment of the multistable display of the present invention.

With reference to FIGS. 4A and 4B, the data signal 11 further includes a pixel clearance header data 113. The driver circuit unit 20 determines a pixel clearance driver signal according to the pixel clearance header data 113. Conventionally, the pixel clearance driver signal has fixed waveforms, and thus, the driver circuit unit 20 is able to use the pixel clearance header data 113 to determine a pixel clearance voltage value for the pixel clearance driver signal, and then configure the pixel clearance driver signal to have fixed waveforms before outputting the pixel clearance driver signal to the screen unit 30.

Figure 5A:
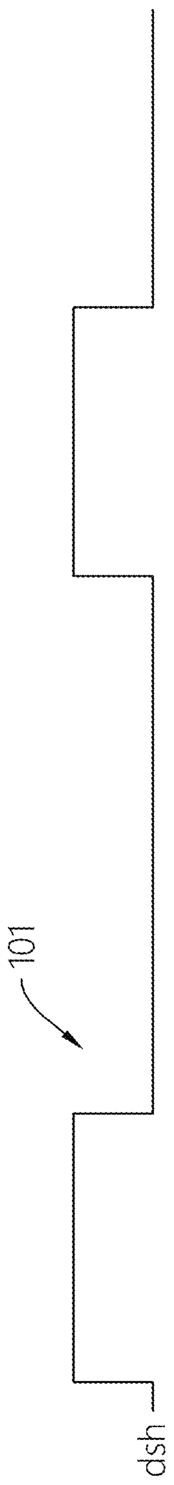
FIG. 5A is a waveform perspective view of the header configuration signal outputted by the header configuration control port (dsh) in a third embodiment of the multistable display of the present invention.
Figure 5B:
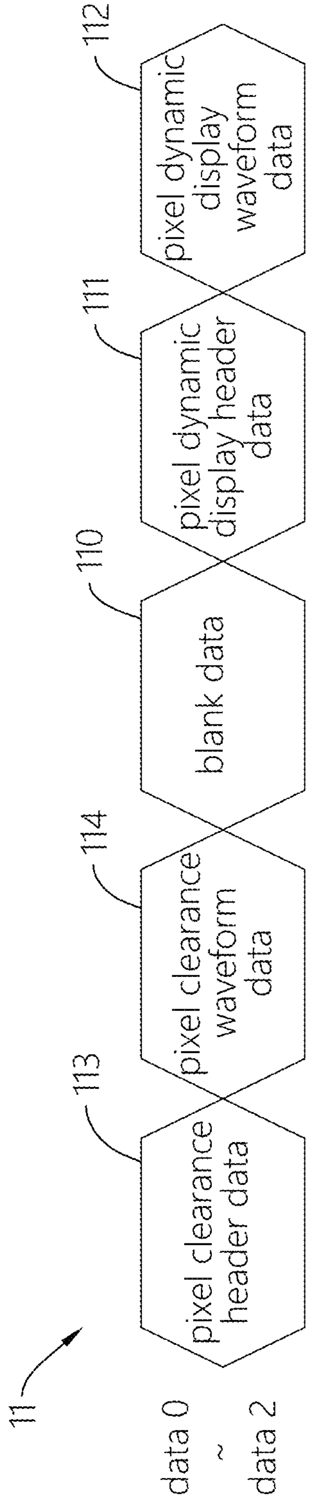
FIG. 5B is a perspective view of the data signal outputted by the at least one data signal output port in the third embodiment of the multistable display of the present invention.

With reference to FIGS. 5A and 5B, the data signal 11 further includes the pixel clearance header data 113 and a pixel clearance waveform data 114. The driver circuit unit 20 determines the pixel clearance voltage value according to the pixel clearance header data 113, and the driver circuit unit 20 determines a pixel clearance driving time duration according to the half duty count and the pixel clearance waveform data 114. In the present embodiment, the pixel clearance driver signal is the pixel driving signals outputted from the driver circuit unit 20 to the pixel electrodes 31.

Furthermore, the data signal 11 also includes a blank data 110. With reference to FIG. 4B, the blank data 110 may be placed between the pixel clearance header data 113 and the pixel dynamic display header data 111. With reference to FIG. 5B, the blank data 110 may also be placed between the pixel clearance waveform data 114 and the pixel dynamic display header data 111. A time window occupied by the blank data 110 allows the driver circuit unit 20 to output the pixel clearance driver signal to the screen unit 30.

More particularly, with reference to FIG. 1, in an embodiment, the time controller circuit unit 10 includes a clock signal output port (clk), a display output enable control port (doe), a display output ground control port (dog), and a display start pulse control port (dsp). The clock signal output port (clk), the display output enable control port (doe), the display output ground control port (dog), and the display start pulse control port (dsp) of the time controller circuit unit 10 are functionally identical with those on a time controller circuit unit of the conventional multistable display described in prior art, and thus further detailed description is omitted.

The time controller circuit unit 10 may also include a header configuration control port (dsh) and at least one data signal output port. In other embodiments, the at least one data signal output port of the time controller circuit unit 10 includes a plurality of data output ports (data 0 to data n), such as a first data output port (data 0) to a $(n+1)^{th}$ data output port (data n), wherein n is free to be any positive integer. For ease of demonstrating the technical features of the present invention, in the present embodiment, an example of having the first data output port (data 0) to a third data output port (data 2) is chosen for the following parts of the detailed description.

The header configuration control port (dsh) is connected to the driver circuit unit 20, and the header configuration control port (dsh) outputs a header configuration signal 101 to the driver circuit unit 20. The data output ports (data 0 to data 2) are connected to the driver circuit unit 20 for outputting the data signal 11 to the driver circuit unit 20.

With reference to FIGS. 3A and 3B, when the data signal 11 outputted from the data output ports (data 0 to data 2) is the pixel dynamic display header data 111, the header configuration control port (dsh) outputs the header configuration signal 101 at a high voltage. With reference to FIGS. 4A and 4B, or with reference to FIGS. 5A and 5B, when the data signal 11 outputted from the data output ports (data 0 to data 2) is the pixel clearance header data 113, the header configuration control port (dsh) also outputs the header configuration signal 101 at the high voltage. However, when the data signal 11 outputted from the data output ports (data 0 to data 2) is neither the pixel clearance header data 113 nor the pixel dynamic display header data 111, the header configuration control port (dsh) outputs the header configuration signal 101 at a low voltage.

In other words, whenever the header configuration control port (dsh) outputs the header configuration signal 101 at the high voltage, the data signal 11 outputted from the data output ports (data 0 to data 2) would be either the pixel clearance header data 113 or the pixel dynamic display header data 111. As such, the driver circuit unit 20 is able to determine whether the data signal 11 currently receiving is the pixel clearance header data 113 or the pixel dynamic display header data 111 according to a voltage of the header configuration signal 101.

Figure 6A:
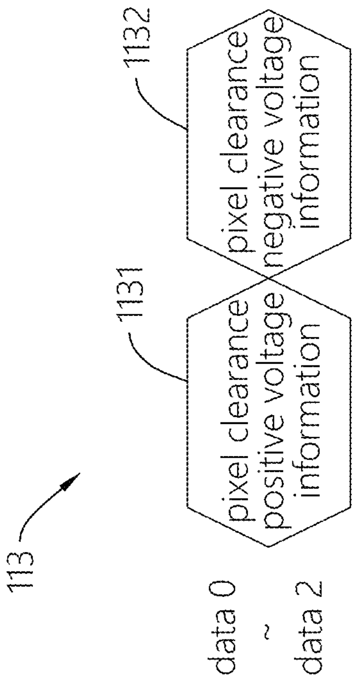
FIG. 6A is a waveform perspective view of the header configuration signal outputted by the header configuration control port (dsh) in a fourth embodiment of the multistable display of the present invention.
Figure 6B:
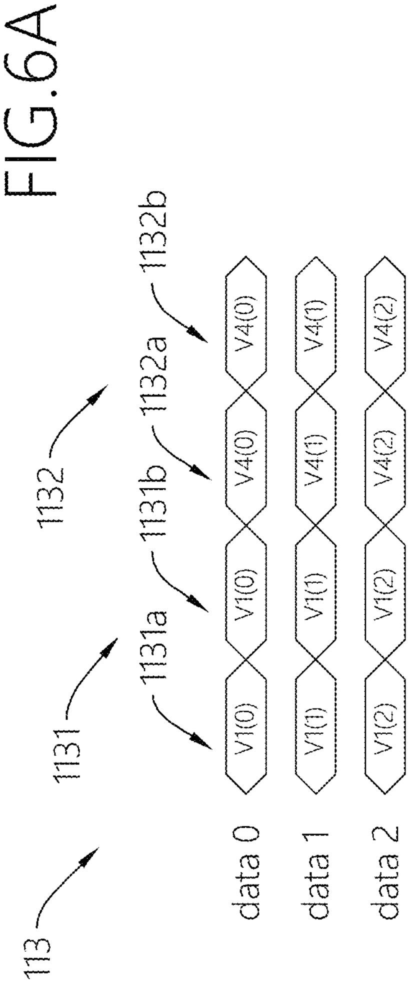
FIG. 6B is a perspective view of the data signal outputted by the at least one data signal output port in the fourth embodiment of the multistable display of the present invention.

With reference to FIGS. 6A and 6B, the pixel clearance header data 113 includes a pixel clearance positive voltage information 1131 and a pixel clearance negative voltage information 1132. The pixel clearance header data 113 also includes a clearance clock information, and the clearance clock information signifies a clock count included in a clearance unit time. The clock count included in the clearance unit time is counted as clock numbers for a duty cycle. For example, the clearance clock information is represented in 3 bits, and the driver circuit unit 20 stores a bits-to-value conversion table. The driver circuit unit 20 is able to obtain a value corresponding to the 3 bits of the clearance clock information. For example, the bits-to-value conversion table is shown in the following Table 2.

TABLE 2

| First bit: | Second bit: | Third bit: | Corresponding clock numbers for a duty cycle: |
|---|---|---|---|
| 0 | 0 | 0 | 0 |
| 0 | 0 | 1 | 0 |
| 0 | 1 | 0 | 2 |
| 0 | 1 | 1 | 2 |
| 1 | 0 | 0 | 4 |
| 1 | 0 | 1 | 4 |
| 1 | 1 | 0 | 6 |
| 1 | 1 | 1 | 6 |

By utilizing Table 2, the driver circuit unit 20 is able to read 3 bits and obtain a value of 0, 2, 4, or 6. For instance, reading 000 or 001 gives the value 0, reading 010 or 011 gives the value 2, reading 100 or 101 gives the value 4, and reading or 111 gives the value 6. For example, when the clearance clock information is configured as 100, each corresponding duty is configured to include a time equivalent of 4 clock numbers. This logic is similarly applied to other possible outcomes as detailed in Table 2. In other words, in the present embodiment, the driver circuit unit 20 is able to read 3 bits and obtain an even numbered value, and this configuration is a simplification for more efficiently conducting subsequent calculations. In other embodiments of the present invention, the driver circuit unit 20 is able to use other methods, i.e. other than utilizing a look-up table, for reading the 3 bits or reading multiple bits to obtain a value.

The pixel clearance positive voltage information 1131 further includes a first pixel clearance positive voltage value 1131*a* and a second pixel clearance positive voltage value 1131*b*. The pixel clearance negative voltage information 1132 further includes a first pixel clearance negative voltage value 1132*a* and a second pixel clearance negative voltage value 1132*b*. In the present embodiment, the first pixel clearance positive voltage value 1131*a* is a first set of values outputted from the first to the third data output ports (data 0 to data 2), and the first pixel clearance positive voltage value 1131*a* is presented in 3 bits, respectively as V1(0) to V1(2), for corresponding to a first voltage V1. For example, the first voltage V1 corresponds to 001, i.e. V1(2)=0, V1(1)=0, and V1(0)=1. The second pixel clearance positive voltage value 1131*b* is a second set of values outputted from the first to the third data output ports (data 0 to data 2), and the second pixel clearance positive voltage value 1131*b* is also presented in 3 bits, for corresponding to the first voltage V1. Similarly, the first pixel clearance negative voltage value 1132*a* is a third set of values outputted from the first to the third data output ports (data 0 to data 2), and the first pixel clearance negative voltage value 1132*a* is presented in 3 bits, respectively as V4(0) to V4(2), for corresponding to a fourth voltage V4. For example, the fourth voltage V4 corresponds to 100, i.e. V4(2)=1, V4(1)=0, and V4(0)=0. The second pixel clearance negative voltage value 1132*b* is a fourth set of values outputted from the first to the third data output ports (data 0 to data 2), and the second pixel clearance negative voltage value 1132*b* is also presented in 3 bits, for corresponding to the fourth voltage V4.

Figure 7A:
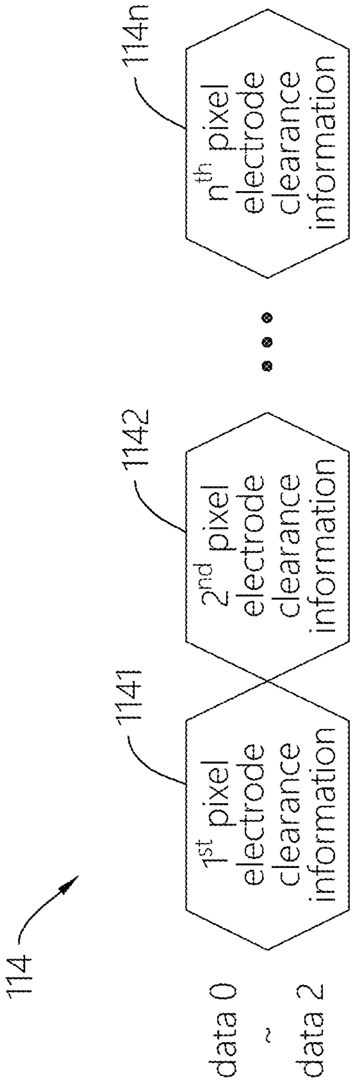
FIG. 7A is a perspective view of a pixel clearance waveform data of the data signal outputted by the at least one data signal output port of the multistable display of the present invention.
Figure 7B:
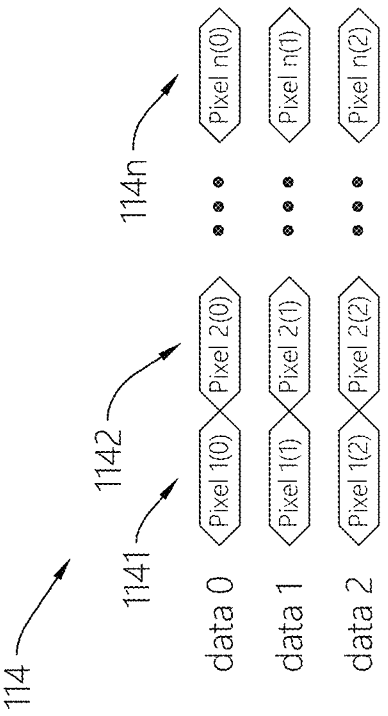
FIG. 7B is a perspective view of the pixel clearance waveform data of the data signal outputted by first to third data output ports (data 0 to data 2) of the multistable display of the present invention.

With reference to FIGS. 7A and 7B, the pixel clearance waveform data 114 includes a plurality of pixel electrode clearance information (1141 to 114*n*). The pixel electrode clearance information (1141 to 114*n*) at least includes a first pixel electrode clearance information 1141, and the first pixel electrode clearance information 1141 includes a first clearance voltage duty number. In the present embodiment, the first clearance voltage duty number is taken from the first to the third data output ports (data 0 to data 2), and the first clearance voltage duty number is represented in 3 bits, respectively as pixel 1(0) to pixel 1(2), for corresponding to a first pixel electrode. In other words, the first clearance voltage duty number is a combination of numbers taken from the first to the third data output ports (data 0 to data 2). The pixel electrode clearance information (1141 to 114*n*) also includes the second to the $n^{th}$ pixel electrode clearance information (1142 to 114*n*), and the second to the $n^{th}$ pixel electrode clearance information (1142 to 114*n*) respectively includes a second clearance voltage duty number to an $n^{th}$ clearance voltage duty number. Similarly, the second clearance voltage duty number is a combination of numbers taken from the first to the third data output ports (data 0 to data 2), and the second clearance voltage duty number is represented in 3 bits, respectively as pixel 2(0) to pixel 2(2), for corresponding to a second pixel electrode.

Furthermore, according to the half duty count, the driver circuit unit 20 calculates a first remaining clearance voltage duty number by subtracting the first clearance voltage duty number from two-folds the half duty count. For example, the half duty count is 6, and two-folds the half duty count is 12. According to the bits-to-value conversion table, when the first clearance voltage duty number is 100, a corresponding value is 4. As the driver circuit unit 20 subtracts the first clearance voltage duty number from two-folds the half duty count, i.e. 12−4=8, the driver circuit unit 20 is able to calculate, obtain, and configure the first remaining clearance voltage duty number as 8. In another example, when the first clearance voltage duty number is 010, a corresponding value of 2 is obtained according to the bits-to-value conversion table, and therefore, the driver circuit unit 20 subtracts the first clearance voltage duty number from two-folds the half duty count, i.e. 12−2=10, resulting in the driver circuit unit 20 configuring the first remaining clearance voltage duty number as 10.

In the present embodiment, the pixel dynamic display header data 111 further includes a half duty count information. The driver circuit unit 20 utilizes the half duty count information to configure the half duty count.

Furthermore, when the driver circuit unit 20 determines the pixel clearance driving time duration, for outputting the pixel clearance driver signal with the pixel clearance voltage value, according to the half duty count and the pixel clearance waveform data 114, the driver circuit unit 20 configures a first clearance time duration according to the first clearance voltage duty number of the pixel clearance waveform data 114, and the driver circuit unit 20 outputs the pixel clearance driver signal with the first pixel clearance positive voltage value to the first pixel electrode for the first clearance time duration. The driver circuit unit 20 further configures a second clearance time duration as two-folds the half duty count minus the first clearance voltage duty number, and the driver circuit unit 20 outputs the pixel clearance driver signal with the second pixel clearance positive voltage value to the first pixel electrode for the second clearance time duration. In other words, the driver circuit unit 20 is able to configure the second clearance time duration according to the first remaining clearance voltage duty number. Furthermore, the driver circuit unit 20 configures a third clearance time duration according to the first clearance voltage duty number of the pixel clearance waveform data 114, and the driver circuit unit 20 outputs the pixel clearance driver signal with the first pixel clearance negative voltage value to the first pixel electrode for the third clearance time duration. The driver circuit unit 20 further configures a fourth clearance time duration according to two-folds the half duty count minus the first clearance voltage duty number, and the driver circuit unit 20 outputs the pixel clearance driver signal with the second pixel clearance negative voltage value to the first pixel electrode for the fourth clearance time duration. In other words, the driver circuit unit 20 is also able to configure the fourth clearance time duration according to the first remaining clearance voltage duty number.

Figure 8A:
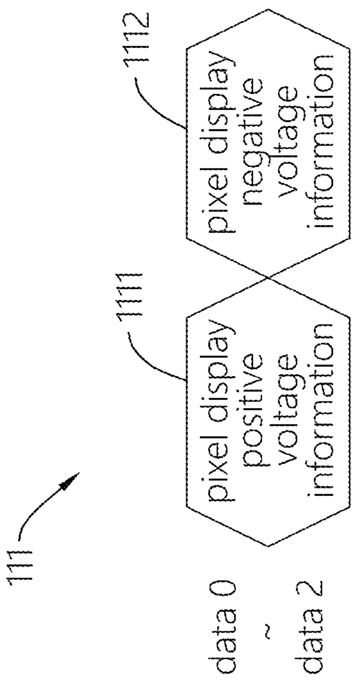
FIG. 8A is a perspective view of a pixel dynamic display header data of the data signal outputted by the at least one data signal output port of the multistable display of the present invention.
Figure 8B:
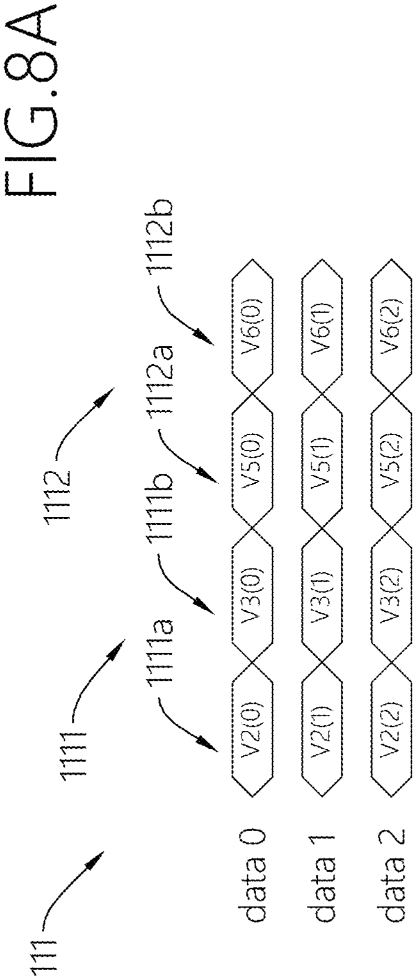
FIG. 8B is a perspective view of the pixel dynamic display header data of the data signal outputted by first to third data output ports (data 0 to data 2) of the multistable display of the present invention.

With reference to FIGS. 8A and 8B, the pixel dynamic display header data 111 includes a pixel display positive voltage information 1111 and a pixel display negative voltage information 1112. The pixel dynamic display header data 111 also further includes a display clock information, the display clock information signifies a clock count included in a display unit time. The clock count included in the display unit time is counted as clock numbers for a duty cycle. For example, the display clock information is represented in 3 bits, and the driver circuit unit 20 utilizes the bits-to-value conversion table for obtaining a value corresponding to the 3 bits of the display clock information. For example, according to the bits-to-value conversion table, 000 corresponds to the value of 0, 100 corresponds to the value of 4, and 111 corresponds to the value of 6. In other words, when the display clock information is configured as 100, each of the duty cycles includes 4 counts of clock number.

The pixel display positive voltage information 1111 further includes a first pixel display positive voltage value 1111*a* and a second pixel display positive voltage value 1111*b*. The pixel display negative voltage information 1112 further includes a first pixel display negative voltage value 1112*a* and a second pixel display negative voltage value 1112*b*. In the present embodiment, the first pixel display positive voltage value 1111*a* is a first set of values outputted from the first to the third data output ports (data 0 to data 2), and the first pixel display positive voltage value 1111*a* is presented in 3 bits, respectively as V2(0) to V2(2), for corresponding to a second voltage V2. For example, the second voltage V2 corresponds to 010, i.e. V2(2)=0, V2(1)=1, and V2(0)=0. The second pixel display positive voltage value 1111*b* is a second set of values outputted from the first to the third data output ports (data 0 to data 2), and the second pixel display positive voltage value 1111*b* is also presented in 3 bits, for corresponding to a third voltage V3. For example, the third voltage V3 corresponds to 011, i.e. V3(2)=0, V3(1)=1, and V3(0)=1. Similarly, the first pixel display negative voltage value 1112*a* is a third set of values outputted from the first to the third data output ports (data 0 to data 2), and the first pixel display negative voltage value 1112*a* is presented in 3 bits, respectively as V5(0) to V5(2), for corresponding to a fifth voltage V5. For example, the fifth voltage V5 corresponds to 101, i.e. V5(2)=1, V5(1)=0, and V5(0)=1. The second pixel display negative voltage value 1112*b* is a fourth set of values outputted from the first to the third data output ports (data 0 to data 2), and the second pixel display negative voltage value 1112*b* is also presented in 3 bits, respectively as V6(0) to V6(2), for corresponding to a sixth voltage V6. For example, the sixth voltage V6 corresponds to 110, i.e. V6(2)=1, V6(1)=1, and V6(0)=0.

In an embodiment, the first voltage V1 and the fourth voltage V4 have same voltage amplitudes with respect to a common voltage Vcom. In other words, an absolute value of a result of the first voltage V1 minus the common voltage Vcom is equal to an absolute value of a result of the fourth voltage V4 minus the common voltage Vcom. Similarly, the second voltage V2 and the fifth voltage V5 have same voltage amplitudes with respect to the common voltage Vcom. The third voltage V3 and the sixth voltage V6 have same voltage amplitudes with respect to the common voltage Vcom.

Figure 9A:
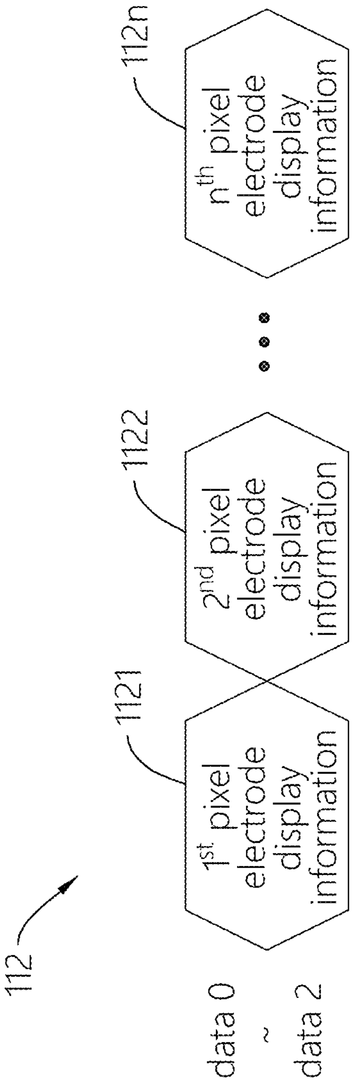
FIG. 9A is a perspective view of a pixel dynamic display waveform data of the data signal outputted by the at least one data signal output port of the multistable display of the present invention.
Figure 9B:
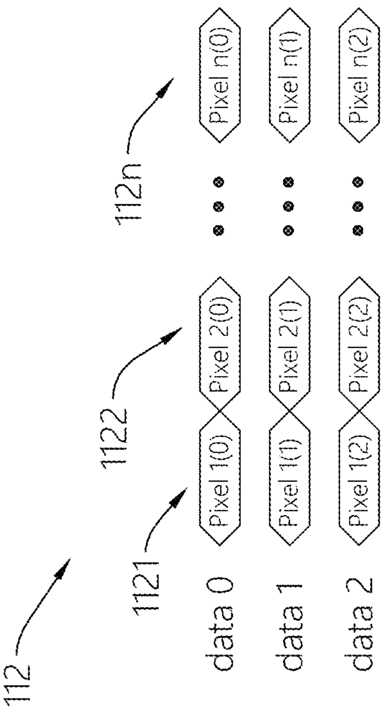
FIG. 9B is a perspective view of the pixel dynamic display waveform data of the data signal outputted by the first to third data output ports (data 0 to data 2) of the multistable display of the present invention.

With reference to FIGS. 9A and 9B, the pixel dynamic display waveform data 112 includes a plurality of pixel electrode display information (1121 to 112*n*). The pixel electrode display information (1121 to 112*n*) at least includes a first pixel electrode display information 1121, and the first pixel electrode display information 1121 includes a first display voltage duty number. In the present embodiment, the first display voltage duty number is taken from the first to the third data output ports (data 0 to data 2), and the first display voltage duty number is represented in 3 bits, respectively as pixel 1(0) to pixel 1(2), for corresponding to a first pixel electrode. In other words, the first display voltage duty number is a combination of numbers taken from the first to the third data output ports (data 0 to data 2). The pixel electrode display information (1121 to 112*n*) also includes the second to the $n^{th}$ pixel electrode display information (1122 to 112*n*), and the second to the $n^{th}$ pixel electrode display information (1122 to 112*n*) respectively include a second display voltage duty number to an $n^{th}$ display voltage duty number. Similarly, the second display voltage duty number is a combination of numbers taken from the first to the third data output ports (data 0 to data 2), and the second display voltage duty number is represented in 3 bits, respectively as pixel 2(0) to pixel 2(2), for corresponding to the second pixel electrode.

Furthermore, according to the half duty count, the driver circuit unit 20 calculates a first remaining display voltage duty number by subtracting the first display voltage duty number from the half duty count. For example, the half duty count is 6. According to the bits-to-value conversion table, when the first display voltage duty number is 100, a corresponding value is 4. As the driver circuit unit subtracts the first display voltage duty number from the half duty count, i.e. 6−4=2, the driver circuit unit 20 is able to calculate, obtain, and configure the first remaining display voltage duty number as 2. In another example, when the first display voltage duty number is 010, a corresponding value of 2 is obtained according to the bits-to-value conversion table, and therefore, the driver circuit unit 20 subtracts the first display voltage duty number from the half duty count, i.e. 6−2=4, resulting in the driver circuit unit 20 configuring the first remaining display voltage duty number as 4.

In the present embodiment, the pixel clearance waveform data 114 further includes the half duty count information. The driver circuit unit 20 utilizes the half duty count information to configure the half duty count.

Moreover, when the driver circuit unit 20 determines the pixel display driving time duration, for outputting the pixel display driver signal with the pixel display voltage value, the driver circuit unit 20 configures a first display time duration according to the first display voltage duty number of the pixel dynamic display waveform data 112, and the driver circuit unit 20 outputs the pixel display driver signal with the first pixel display positive voltage value to the first pixel electrode for the first display time duration. The driver circuit unit 20 further configures a second display time duration according to the half duty count, and the driver circuit unit 20 outputs the pixel display driver signal with the second pixel display positive voltage value to the first pixel electrode for the second display time duration. The driver circuit unit 20 also configures a third display time duration according to the first remaining display voltage duty number, and the driver circuit unit 20 outputs the pixel display driver signal with the first pixel display positive voltage value to the first pixel electrode for the third display time duration. Furthermore, the driver circuit unit 20 configures a fourth display time duration according to the first display voltage duty number of the pixel dynamic display waveform data 112, and the driver circuit unit 20 outputs the pixel display driver signal with the first pixel display negative voltage value to the first pixel electrode for the fourth display time duration. The driver circuit unit 20 further configures a fifth display time duration according to the half duty count, and the driver circuit unit 20 outputs the pixel display driver signal with the second pixel display negative voltage value to the first pixel electrode for the fifth display time duration. The driver circuit unit 20 also configures a sixth display time duration according to the first remaining display voltage duty number, and the driver circuit unit 20 outputs the pixel display driver signal with the first pixel display negative voltage value to the first pixel electrode for the sixth display time duration.

Figure 10:
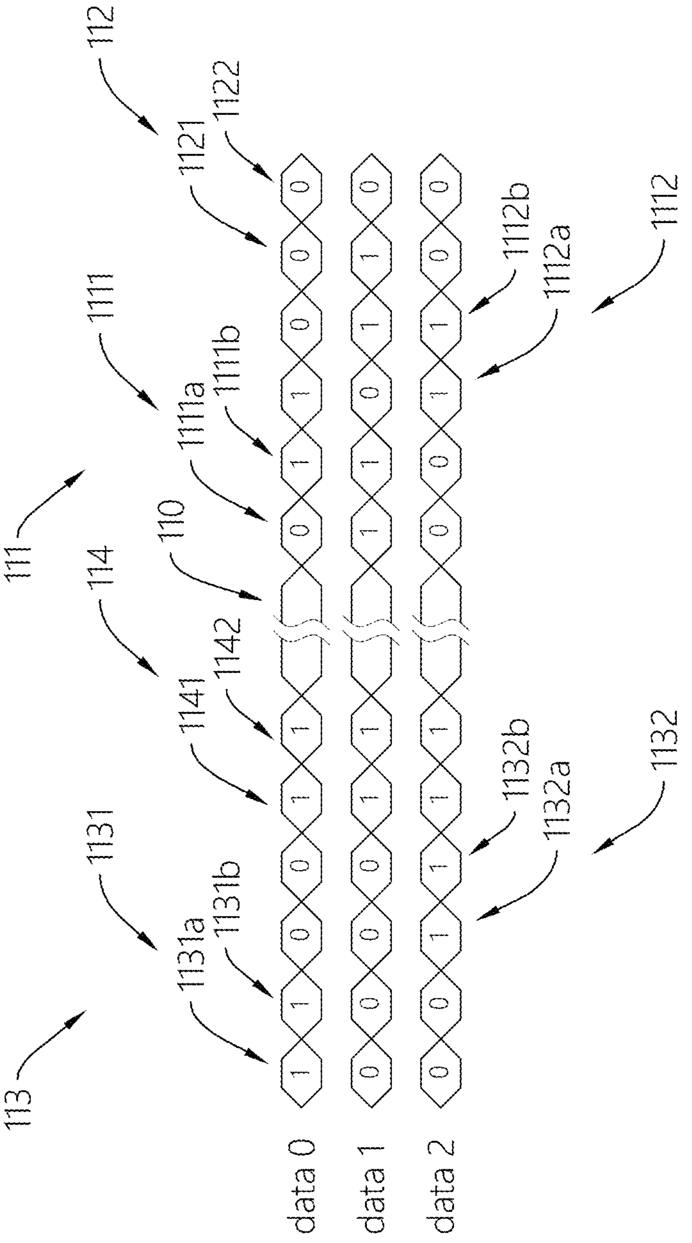
FIG. 10 is a perspective view of the data signal outputted by the first to third data output ports (data 0 to data 2) of the multistable display of the present invention.

With reference to FIG. 10, for example, the half duty count is configured as an integer of 6. As shown for the first pixel electrode clearance information 1141, the first clearance voltage duty number is 111. As shown for the second pixel electrode clearance information 1142, the second clearance voltage duty number is 111. As shown for the first pixel clearance positive voltage value 1131*a*, the first pixel clearance positive voltage value is the first voltage V1, i.e. 001. As shown for the second pixel clearance positive voltage value 1131*b*, the second pixel clearance positive voltage value is the first voltage V1, i.e. 001. As shown for the first pixel clearance negative voltage value 1132*a*, the first pixel clearance negative voltage value is the fourth voltage V4, i.e. 100. As shown for the second pixel clearance negative voltage value 1132*b*, the second pixel clearance negative voltage value is the fourth voltage V4, i.e. 100. As shown for the first pixel electrode display information 1121, the first display voltage duty number is 010. As shown for the second pixel electrode display information 1122, the second display voltage duty number is 000. As shown for the first pixel display positive voltage value 1111*a*, the first pixel display positive voltage value is the second voltage V2, i.e. 010. As shown for the second pixel display positive voltage value 1111*b*, the second pixel display positive voltage value is the third voltage V3, i.e. 011. As shown for the first pixel display negative voltage value 1112*a*, the first pixel display negative voltage value is the fifth voltage V5, i.e. 101. As shown for the second pixel display negative voltage value 1112*b*, the second pixel display negative voltage value is the sixth voltage V6, i.e. 110.

For example, in an embodiment, according to the bits-to-value conversion table, when the first clearance voltage duty number is 111, the driver circuit unit 20 outputs the pixel clearance driver signal with the first pixel clearance positive voltage value, i.e. the first voltage V1, to the first pixel electrode for the first clearance time duration of 6 clocks of duty time. Moreover, the half duty count is 6, and two-folds the half duty count is 12. As two-folds the half duty count minus the first clearance time duration equals 6, i.e. 12−6=6, the second clearance time duration is obtained as 6 clocks of duty time.

As the driver circuit unit 20 enters a negative half cycle, the driver circuit unit 20 outputs the pixel clearance driver signal with the first pixel clearance negative voltage value, i.e. the fourth voltage V4, to the first pixel electrode for the third clearance time duration of 6 clocks of duty time. Moreover, the half duty count is 6, and as two-folds the half duty count minus the first clearance time duration equals 6, i.e. 12−6=6, the fourth clearance time duration is obtained as 6 clocks of duty time.

Similarly, according to the bits-to-value conversion table, when the second clearance voltage duty number is 111, the driver circuit unit 20 outputs the pixel clearance driver signal with the first pixel clearance positive voltage value, i.e. the first voltage V1, to the second pixel electrode for the first clearance time duration of 6 clocks of duty time. Moreover, the half duty count is 6, and as two-folds the half duty count minus the first clearance time duration equals 6, i.e. 12−6=6, the second clearance time duration is obtained as 6 clocks of duty time.

As the driver circuit unit 20 enters the negative half cycle, the driver circuit unit 20 outputs the pixel clearance driver signal with the first pixel clearance negative voltage value, i.e. the fourth voltage V4, to the second pixel electrode for the third clearance time duration of 6 clocks of duty time. Similarly, since the half duty count is 6, and as two-folds the half duty count minus the first clearance time duration equals 6, i.e. 12−6=6, the fourth clearance time duration is obtained as 6 clocks of duty time.

In another embodiment, the driver circuit unit 20 may also configure the pixel clearance driver signal according to the pixel clearance header data 113 for outputting the pixel clearance driver signal to the screen unit 30. Conventionally, the pixel clearance driver signal has fixed waveforms, and thus, the driver circuit unit 20 is able to use the pixel clearance header data 113 to determine the pixel clearance voltage value for the pixel clearance driver signal, and then configure the pixel clearance driver signal to have fixed waveforms before outputting the pixel clearance driver signal to the screen unit 30.

Moreover, when the first display voltage duty number is 010, the driver circuit unit 20 outputs the pixel display driver signal with the first pixel display positive voltage value, i.e. the second voltage V2, to the first pixel electrode for the first display time duration of 2 clocks of duty time. Moreover, as the half duty count is 6, the driver circuit unit 20 outputs the pixel display driver signal with the second pixel display positive voltage value, i.e. the first voltage V1, to the first pixel electrode for the second display time duration of 6 clocks of duty time. Since the driver circuit unit 20 calculates 6−2=4, the driver circuit unit 20 obtains that the first remaining display voltage duty number is obtained and configured as 4 clocks of duty time. As a result, the driver circuit unit 20 outputs the pixel display driver signal with the first pixel display positive voltage value, i.e. the second voltage V2, to the first pixel electrode for the third display time duration of 4 clocks of duty time.

As the driver circuit unit 20 enters the negative half cycle, the driver circuit unit 20 outputs the pixel display driver signal with the first pixel display negative voltage value, i.e. the fifth voltage V5, to the first pixel electrode for the fourth display time duration of 2 clocks of duty time. Moreover, as the half duty count is 6, the driver circuit unit 20 outputs the pixel display driver signal with the second pixel display negative voltage value, i.e. the fourth voltage V4, to the first pixel electrode for the fifth display time duration of 6 clocks of duty time. Since the first remaining display voltage duty number is 4, the driver circuit unit 20 outputs the pixel display driver signal with the first pixel display negative voltage value, i.e. the fifth voltage V5, to the first pixel electrode for the sixth display time duration of 4 clocks of duty time.

Similarly, when the second display voltage duty number is 000, the driver circuit unit 20 outputs the pixel display driver signal with the first pixel display positive voltage value, i.e. the first voltage V1, to the second pixel electrode for the first display time duration of 0 clocks of duty time. Moreover, as the half duty count is 6, the driver circuit unit 20 outputs the pixel display driver signal with the second pixel display positive voltage value, i.e. the second voltage V2, to the second pixel electrode for the second display time duration of 6 clocks of duty time. Since the driver circuit unit 20 calculates 6−0=6, the driver circuit unit 20 obtains that the first remaining display voltage duty number is obtained and configured as 6 clocks of duty time. As a result, the driver circuit unit 20 outputs the pixel display driver signal with the first pixel display positive voltage value, i.e. the first voltage V1, to the second pixel electrode for the third display time duration of 6 clocks of duty time.

As the driver circuit unit 20 enters the negative half cycle, the driver circuit unit 20 outputs the pixel display driver signal with the first pixel display negative voltage value, i.e. the fourth voltage V4, to the second pixel electrode for the fourth display time duration of 0 clocks of duty time. Moreover, as the half duty count is 6, the driver circuit unit 20 outputs the pixel display driver signal with the second pixel display negative voltage value, i.e. the fifth voltage V5, to the second pixel electrode for the fifth display time duration of 6 clocks of duty time. Since the first remaining display voltage duty number is 6, the driver circuit unit 20 outputs the pixel display driver signal with the first pixel display negative voltage value, i.e. the fourth voltage V4, to the second pixel electrode for the sixth display time duration of 6 clocks of duty time.

Figure 11A:
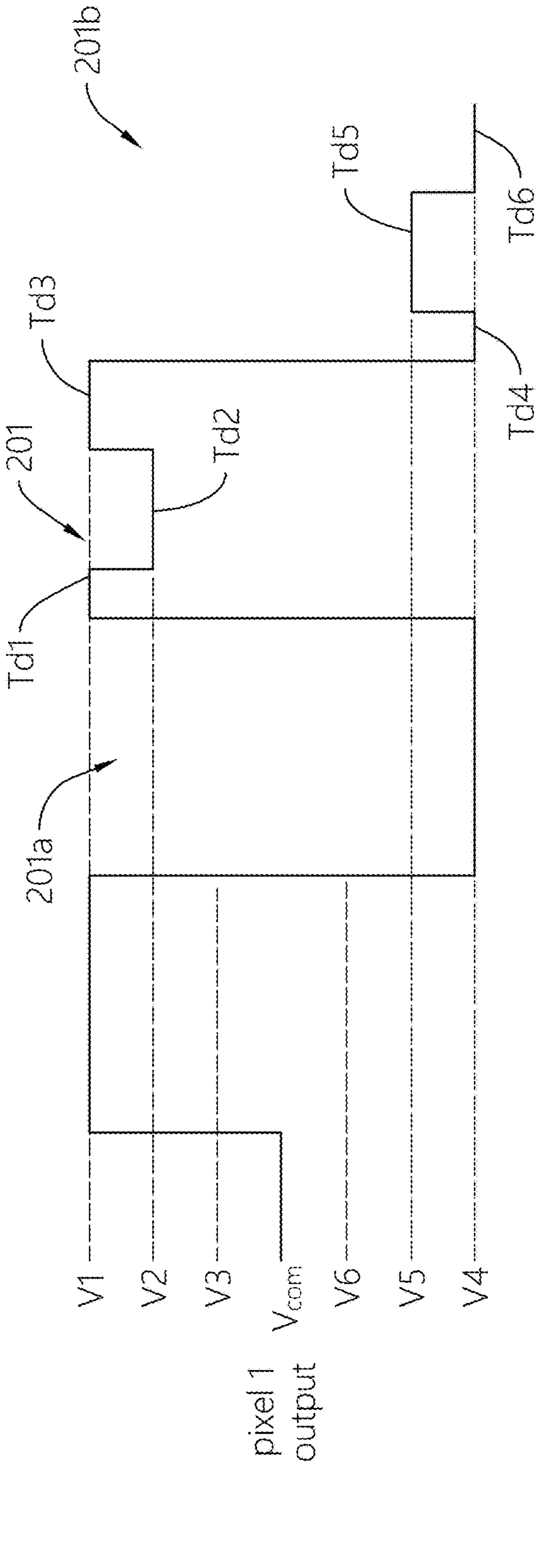
FIG. 11A is a waveform perspective view of the data signal outputted from a driver circuit unit to a first pixel electrode in the multistable display of the present invention.
Figure 11B:
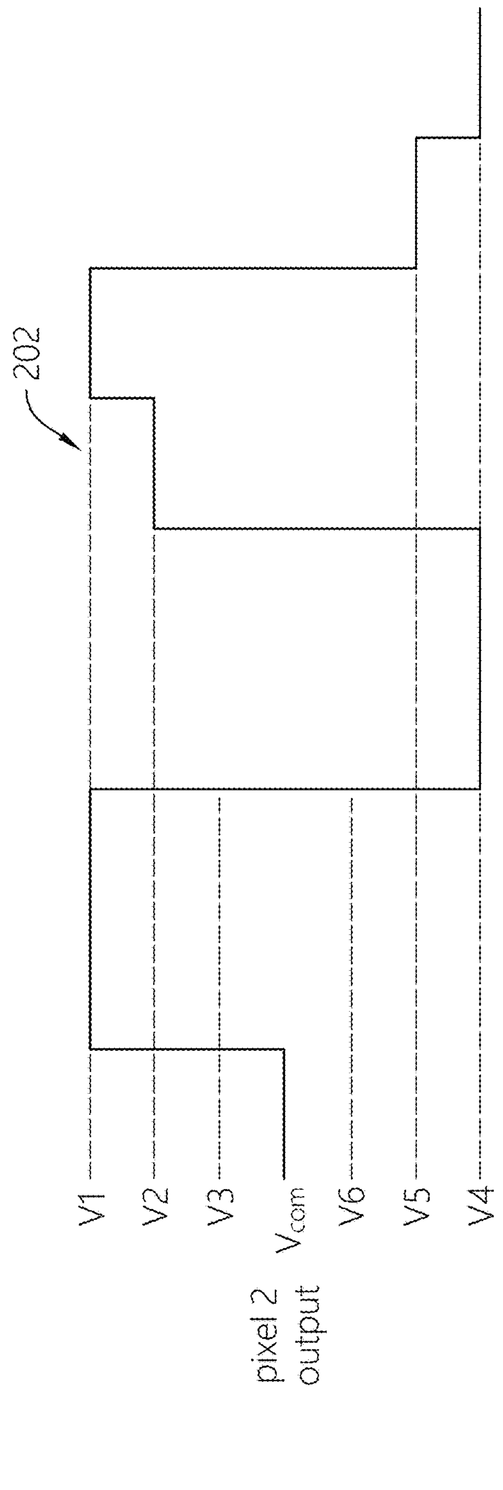
FIG. 11B is a waveform perspective view of the data signal outputted from the driver circuit unit to a second pixel electrode in the multistable display of the present invention.
Figure 11C:
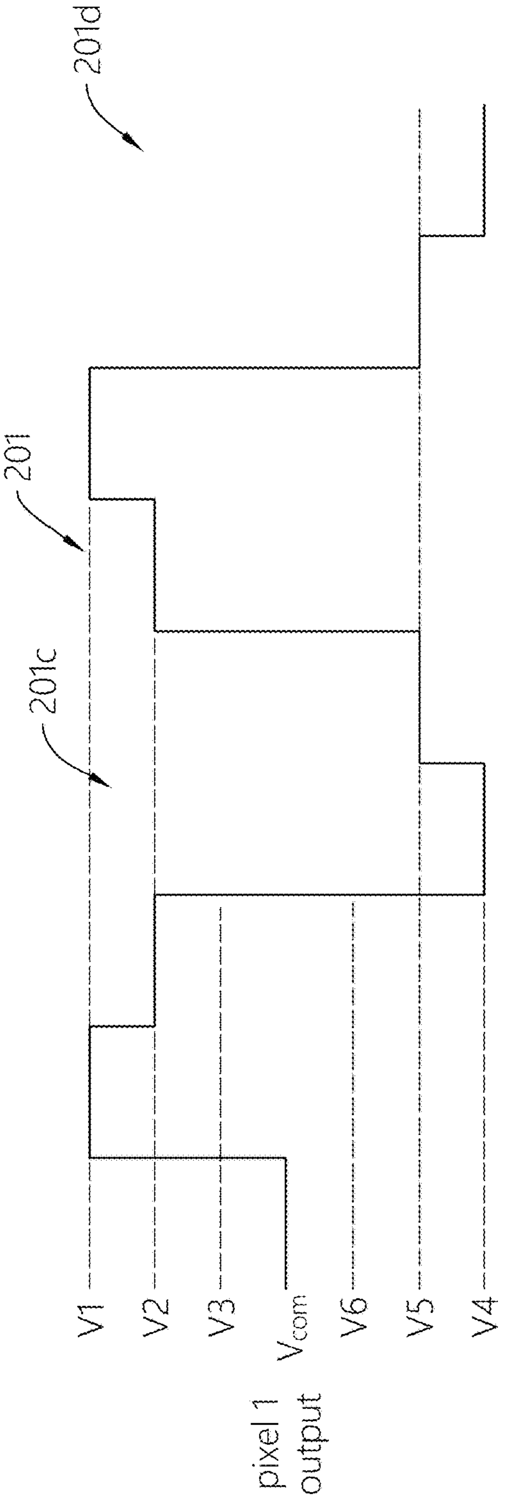
FIG. 11C is another waveform perspective view of the data signal outputted from the driver circuit unit to the first pixel electrode in the multistable display of the present invention.

With reference to FIGS. 11A and 11B, FIG. 11A presents a waveform perspective view of a pixel display driver signal waveform 201 outputted from the driver circuit unit 20 to the first pixel electrode, and FIG. 11B presents a waveform perspective view of a pixel display driver signal waveform 202 outputted from the driver circuit unit 20 to the second pixel electrode. With reference to FIGS. 11A and 11C, the pixel display driver signal waveform 201 shown in FIG. 11A includes a first voltage waveform 201*a* and a second voltage waveform 201*b*. The first voltage waveform 201*a* is sequentially configured to be earlier than the second voltage waveform 201*b*. The first voltage waveform 201*a* corresponds to a state of the driver circuit unit 20 controlling the first pixel electrode to reset (to clear displaying information), and the second voltage waveform 201*b* corresponds to a state of the driver circuit unit 20 controlling the first pixel electrode to display a first dynamic display information with a first dynamic display signal waveform. The pixel display driver signal waveform 201 shown in FIG. 11C includes a third voltage waveform 201*c* and a fourth voltage waveform 201*d*. The third voltage waveform 201*c* is sequentially configured to be later than the second voltage waveform 201*b* but earlier than the fourth voltage waveform 201*d*. The third voltage waveform 201*c* corresponds to a state of the driver circuit unit 20 controlling the first pixel electrode to display a second dynamic display information with a second dynamic display signal waveform. The fourth voltage waveform 201*d* corresponds to a state of the driver circuit unit 20 controlling the first pixel electrode to display a third dynamic display information with a third dynamic display signal waveform. Overall, after the driver circuit unit 20 resets (clears displaying information) for the first pixel electrode, the driver circuit unit 20 sequentially uses the first dynamic display signal waveform, the second dynamic display signal waveform, and the third dynamic display signal waveform to control the first pixel electrode for displaying information.

Particularly, in an example, with regards to the second voltage waveform 201*b*, a first displaying time Td1 corresponds to a part of the second voltage waveform 201*b* at the first voltage V1, a second displaying time Td2 corresponds to a part of the second voltage waveform 201*b* at the second voltage V2, a third displaying time Td3 corresponds to another part of the second voltage waveform 201*b* at the first voltage V1, a fourth displaying time Td4 corresponds to a part of the second voltage waveform 201*b* at the fourth voltage V4, a fifth displaying time Td5 corresponds to a part of the second voltage waveform 201*b* at the fifth voltage V5, and a sixth displaying time Td6 corresponds to another part of the second voltage waveform 201*b* at the fourth voltage V4.

The pixel display driver signal waveform 201 outputted from the driver circuit unit 20 to the first pixel electrode and the pixel display driver signal waveform 202 outputted from the driver circuit unit 20 to the second pixel electrode may vary according to different colors and different saturations configured by the driver circuit unit 20 for the screen unit 30.

In an example, the multistable display driven by DDS is configured to display Full HD resolution of 1920×1080. When using single data rate (SDR) for transporting data, each cycle of the clock signal is able to include and transport data for one pixel, thus in other words, the pixel per clock is 1. Furthermore, a transportation time ($T_{line}$) is configured to be 5 milliseconds (ms).

A clock rate of the multistable display driven by DDS is calculated with the following formula:

$$\text{clock rate (Hz)} = \frac{\text{(resolution)}}{\text{(piexl per clock)}} \times \frac{1}{(T_{line})}$$

More particularly, when the resolution is 1920, the pixel per clock under SDR is 1, and the transportation time ($T_{line}$) is configured as 5 ms, the clock rate is obtained as shown in the following Table 3:

TABLE 3

| Resolution | Mode | Pixel per clock | Duty count | $T_{line}$ | Clock rate |
|---|---|---|---|---|---|
| Full HD (1920 × 1080) | SDR | 1 | 64 | 5(ms) | 384.8(kHz) |

Comparing Table 1 and Table 3, the clock rate of the multistable display driven by DDS is lower than a clock rate of the conventional multistable display, and thus the multistable display of the present invention is able to decrease power consumption.

Figure 12:
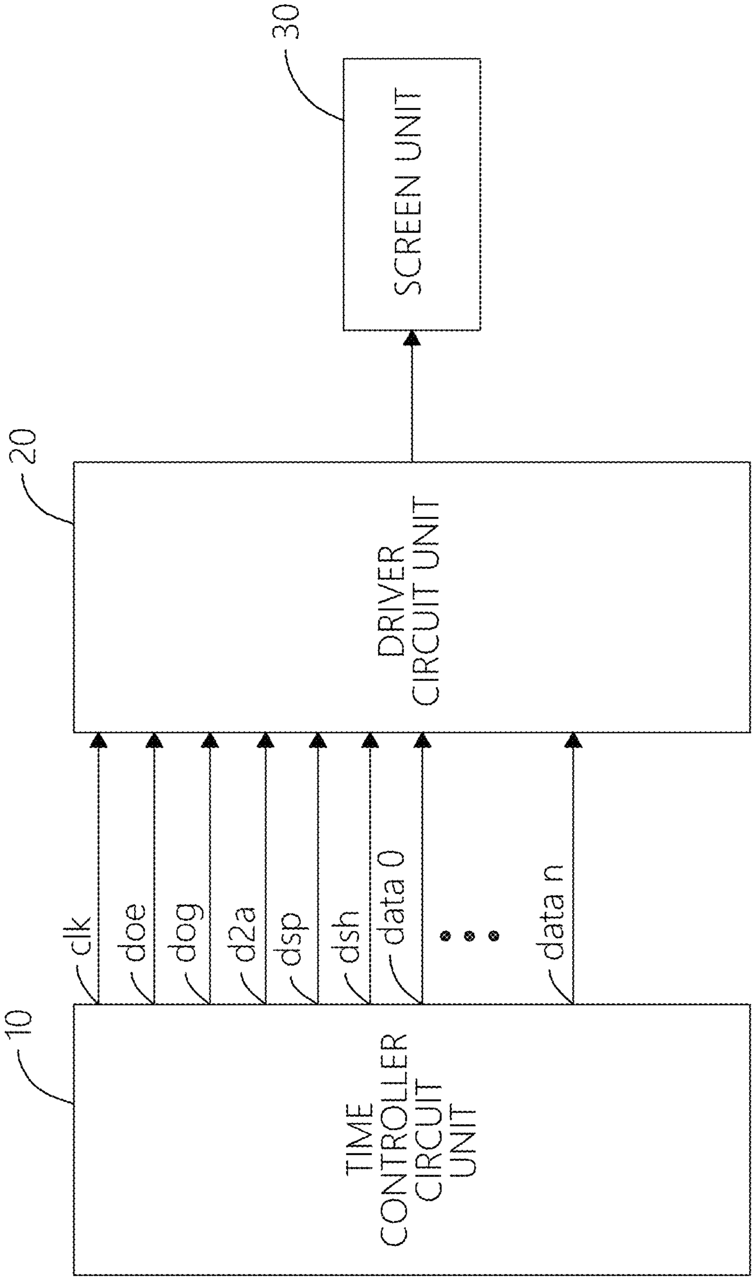
FIG. 12 is another block diagram of the multistable display of the present invention.

17 With reference to FIG. 12, in an embodiment, the time controller circuit unit 10 includes a clock signal output port (clk), a display output enable control port (doe), a display output ground control port (dog), a display start pulse control port (dsp), and a digital to analog control port (d2*a*). The clock signal output port (clk), the display output enable control port (doe), the display output ground control port (dog), and the display start pulse control port (dsp) of the time controller circuit unit 10 are functionally identical with those on a time controller circuit unit of the conventional multistable display described in prior art, and thus further detailed description is omitted.

Furthermore, the digital to analog control port (d2*a*) is connected to the driver circuit unit 20. The time controller circuit unit 10 also includes the header configuration control port (dsh) and the at least one data signal output port. In other embodiments, the at least one data signal output port of the time controller circuit unit 10 includes the plurality of data output ports (data 0 to data n), such as the first data output port (data 0) to the $(n+1)^{th}$ data output port (data n), wherein n is free to be any positive integer. In the present embodiment, the time controller circuit unit 10 includes the first data output port (data 0) to the third data output port (data 2).

Figure 14A:
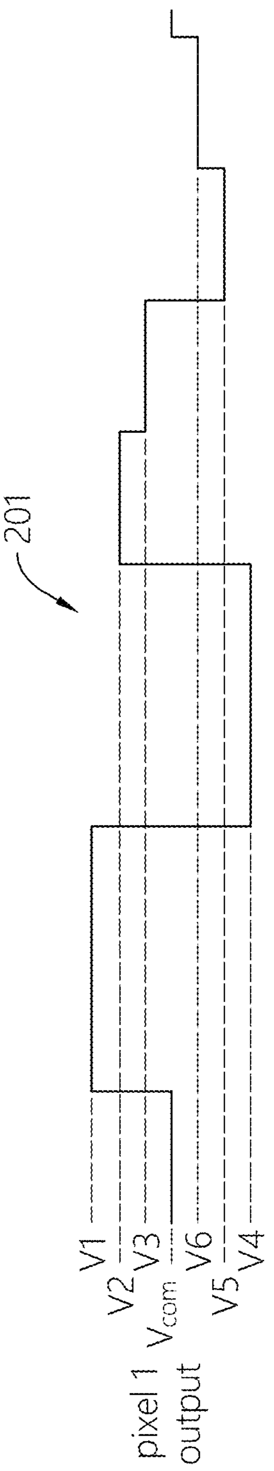
FIG. 14A is a waveform perspective view of the data signal outputted from the driver circuit unit to the first pixel electrode in the multistable display of the present invention.
Figure 14B:
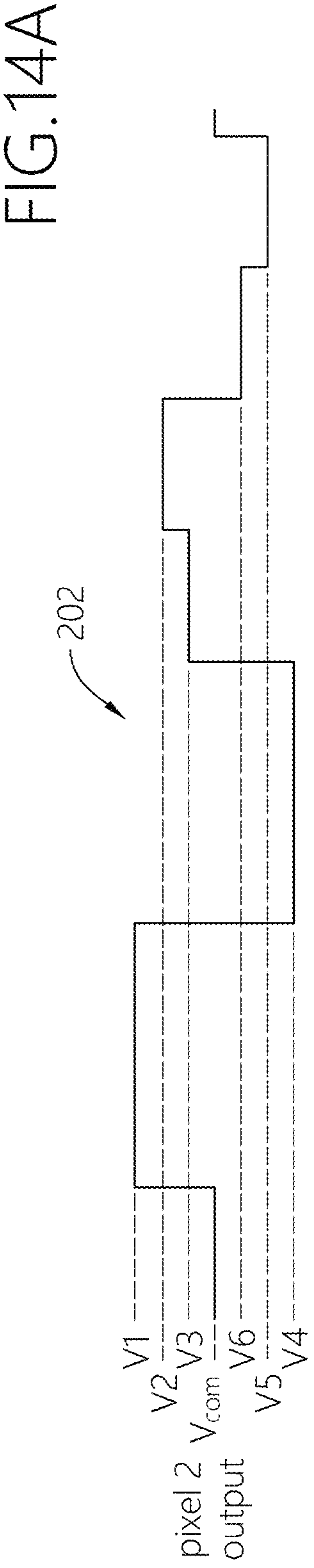
FIG. 14B is a waveform perspective view of the data signal outputted from the driver circuit unit to the second pixel electrode in the multistable display of the present invention.
Figure 14C:
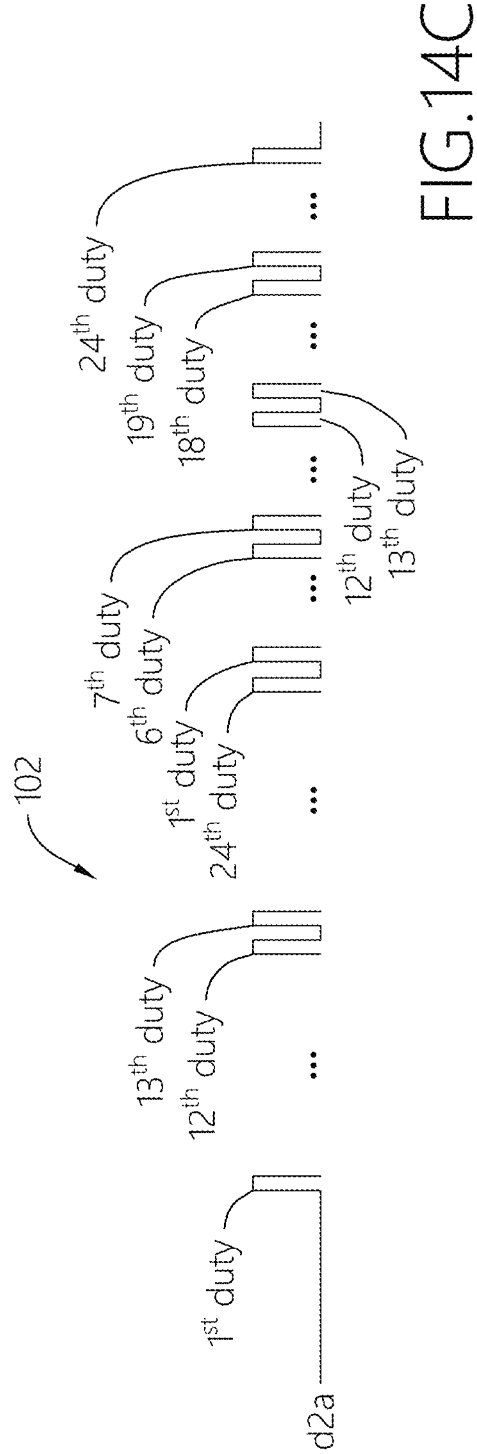
FIG. 14C is a perspective view of a conversion control signal outputted by a digital to analog control port (d2*a*) of the multistable display of the present invention.

In the present embodiment, when the data signal 11 is a header hold time data, the digital to analog control port (d2*a*) outputs a conversion control signal having a plurality of counting signals 102, as shown in FIG. 14C, wherein a number of the counting signals 102 is even multiples of the half duty count. For example, in the present embodiment, the number of the counting signals 102 outputted from the digital to analog control port (d2*a*) equals 4-folds the half duty count.

Further, when the data signal 11 is a display hold time data, the digital to analog control port (d2*a*) also outputs the plurality of counting signals 102, wherein the number of the counting signals 102 is even multiples of the half duty count. For example, in the present embodiment, the number of the counting signals 102 outputted from the digital to analog control port (d2*a*) equals 4-folds the half duty count.

Figure 13:
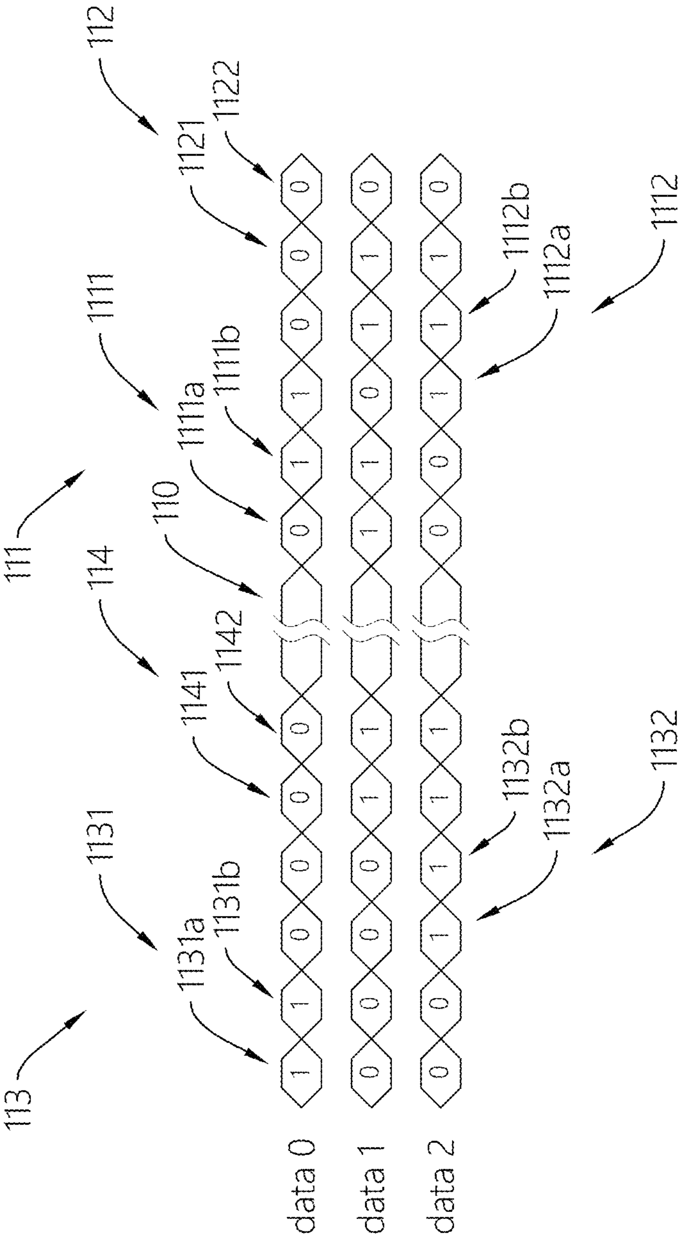
FIG. 13 is a perspective view of the data signal outputted by the first to third data output ports (data 0 to data 2) of the multistable display of the present invention.

With reference to FIG. 13, in the present embodiment, the pixel clearance header data 113 includes a pixel clearance positive voltage information 1131 and a pixel clearance negative voltage information 1132. The pixel clearance positive voltage information 1131 further includes a first pixel clearance positive voltage value 1131*a* and a second pixel clearance positive voltage value 1131*b*. The pixel clearance negative voltage information 1132 further includes a first pixel clearance negative voltage value 1132*a* and a second pixel clearance negative voltage value 1132*b*. In the present embodiment, the first pixel clearance positive voltage value 1131*a* is a first set of values outputted from the first to the third data output ports (data 0 to data 2), and the first pixel clearance positive voltage value 1131*a* is presented in 3 bits, respectively as V1(0) to V1(2), for corresponding to a first voltage V1, i.e. corresponding to 001. The second pixel clearance positive voltage value 1131*b* is a second set of values outputted from the first to the third data output ports (data 0 to data 2), and the second pixel clearance positive voltage value 1131*b* is also presented in 3 bits, for corresponding to the first voltage V1, i.e. corresponding to 001. Similarly, the first pixel clearance negative voltage value 1132*a* is a third set of values outputted from the first to the third data output ports (data 0 to data 2), and the first pixel clearance negative voltage value 1132*a* is presented in 3 bits, respectively as V4(0) to V4(2), for corresponding to a fourth voltage V4, i.e. corresponding to 100. The second pixel clearance negative voltage value 1132*b* is a fourth set of values outputted from the first to the third data output ports (data 0 to data 2), and the second pixel clearance negative voltage value 1132*b* is also presented in 3 bits, for corresponding to the fourth voltage V4, i.e. corresponding to 100.

The pixel clearance waveform data 114 includes a plurality of pixel electrode clearance information (1141 to 114*n*). The pixel electrode clearance information (1141 to 114*n*) at least includes a first pixel electrode clearance information 1141, and the first pixel electrode clearance information 1141 includes a first clearance voltage duty number. In the present embodiment, the first clearance voltage duty number is taken from the first to the third data output ports (data 0 to data 2), and the first clearance voltage duty number is represented in 3 bits, respectively as pixel 1(0) to pixel 1(2), for corresponding to the first pixel electrode. For example, the first clearance voltage duty number of the first pixel electrode clearance information 1141 is 110. The pixel electrode clearance information (1141 to 114*n*) also includes the second to the $n^{th}$ pixel electrode clearance information (1142 to 114*n*), and the second to the $n^{th}$ pixel electrode clearance information (1142 to 114*n*) respectively include a second clearance voltage duty number to an $n^{th}$ clearance voltage duty number. Similarly, the second clearance voltage duty number is taken from the first to the third data output ports (data 0 to data 2), and the second clearance voltage duty number is represented in 3 bits, respectively as pixel 2(0) to pixel 2(2), for corresponding to a second pixel electrode. For example, the second clearance voltage duty number of the second pixel electrode clearance information 1142 is 110.

Furthermore, when the driver circuit unit 20 determines the pixel clearance driving time duration, for outputting the pixel clearance driver signal with the pixel clearance voltage value, according to the half duty count and the pixel clearance waveform data 114, the driver circuit unit 20 outputs the pixel clearance driver signal with the first pixel clearance positive voltage value to the first pixel electrode for the time when the driver circuit unit 20 receives a $1^{st}$ counting signal to a (the first clearance voltage duty number)$^{th}$ counting signal outputted from the digital to analog control port (d2*a*). The driver circuit unit 20 outputs the pixel clearance driver signal with the second pixel clearance positive voltage value to the first pixel electrode for the time when the driver circuit unit 20 receives a (the first clearance voltage duty number+1)$^{th}$ counting signal to a (the first clearance voltage duty number+half duty count)$^{th}$ counting signal outputted from the digital to analog control port (d2*a*). The driver circuit unit 20 once more outputs the pixel clearance driver signal with the first pixel clearance positive voltage value to the first pixel electrode for the time when the driver circuit unit 20 receives a (the first clearance voltage duty number+half duty count+1)$^{th}$ counting signal to a (two-folds the half duty count)$^{th}$ counting signal outputted from the digital to analog control port (d2*a*). The driver circuit unit 20 outputs the pixel clearance driver signal with the first pixel clearance negative voltage value to the first pixel electrode for the time when the driver circuit unit 20 receives a (two-folds the half duty count+1)$^{th}$ counting signal to a (two-folds the half duty count+the first clearance voltage duty number)$^{th}$ counting signal outputted from the digital to analog control port (d2*a*). The driver circuit unit 20 outputs the pixel clearance driver signal with the second pixel clearance negative voltage value to the first pixel electrode for the time when the driver circuit unit 20 receives a (two-folds the half duty count+the first clearance voltage duty number+1)$^{th}$ counting signal to a (three-folds the half duty count+the first clearance voltage duty number)$^{th}$ counting signal outputted from the digital to analog control port (d2*a*). The driver circuit unit 20 once more outputs the pixel clearance driver signal with the first pixel clearance negative voltage value to the first pixel electrode for the time when the driver circuit unit 20 receives a (three-folds the half duty count+the first clearance voltage duty number+1)$^{th}$ counting signal to a (four-folds the half duty count)$^{th}$ counting signal outputted from the digital to analog control port (d2*a*).

The pixel dynamic display header data 111 includes a pixel display positive voltage information 1111 and a pixel display negative voltage information 1112. The pixel display positive voltage information 1111 further includes a first pixel display positive voltage value 1111*a* and a second pixel display positive voltage value 1111*b*. The pixel display negative voltage information 1112 further includes a first pixel display negative voltage value 1112*a* and a second pixel display negative voltage value 1112*b*. In the present embodiment, the time controller circuit unit 10 includes the first data output port (data 0) to the third data output port (data 2). The first pixel display positive voltage value 1111*a* is outputted from the first to the third data output ports (data 0 to data 2), and the first pixel display positive voltage value 1111*a* is presented in 3 bits, respectively as V2(0) to V2(2), for corresponding to a second voltage V2, i.e. 010. The second pixel display positive voltage value 1111*b* is outputted from the first to the third data output ports (data 0 to data 2), and the second pixel display positive voltage value 1111*b* is also presented in 3 bits, respectively as V3(0) to V3(2), for corresponding to a third voltage V3, i.e. 011. Similarly, the first pixel display negative voltage value 1112*a* is outputted from the first to the third data output ports (data 0 to data 2), and the first pixel display negative voltage value 1112*a* is presented in 3 bits, respectively as V5(0) to V5(2), for corresponding to a fifth voltage V5, i.e. 101. The second pixel display negative voltage value 1112*b* is outputted from the first to the third data output ports (data 0 to data 2), and the second pixel display negative voltage value 1112*b* is also presented in 3 bits, respectively as V6(0) to V6(2), for corresponding to a sixth voltage V6, i.e. 110.

The pixel dynamic display waveform data 112 includes a plurality of pixel electrode display information (1121 to 112*n*). The pixel electrode display information (1121 to 112*n*) at least includes a first pixel electrode display information 1121, and the first pixel electrode display information 1121 includes a first display voltage duty number. In the present embodiment, the first display voltage duty number includes two sets of numbers taken from the first to the third data output ports (data 0 to data 2), and the first display voltage duty number is represented in 3 bits, respectively as pixel 1(0) to pixel 1(2), for corresponding to a first pixel electrode. For example, the first display voltage duty number of the first pixel electrode display information 1121 is 110. The pixel electrode display information (1121 to 112*n*) also includes the second to the $n^{th}$ pixel electrode display information (1122 to 112*n*), and the second to the $n^{th}$ pixel electrode display information (1122 to 112*n*) respectively include a second display voltage duty number to an $n^{th}$ display voltage duty number. Similarly, the second display voltage duty number includes two sets of numbers taken from the first to the third data output ports (data 0 to data 2), and the second display voltage duty number is represented in 3 bits, respectively as pixel 2(0) to pixel 2(2), for corresponding to the second pixel electrode. For example, the second display voltage duty number of the second pixel electrode display information 1122 is 000.

When the driver circuit unit 20 determines the pixel display driving time duration, for outputting the pixel display driver signal with the pixel display voltage value, according to the half duty count and the pixel dynamic display waveform data 112, the driver circuit unit 20 outputs the pixel display driver signal with the first pixel display positive voltage value to the first pixel electrode for the time when the driver circuit unit 20 receives a $1^{st}$ counting signal to a (the first display voltage duty number)$^{th}$ counting signal outputted from the digital to analog control port (d2*a*). The driver circuit unit 20 outputs the pixel display driver signal with the second pixel display positive voltage value to the first pixel electrode for the time when the driver circuit unit 20 receives a (the first display voltage duty number+1)$^{th}$ counting signal to a (the first display voltage duty number+ the half duty count)$^{th}$ counting signal outputted from the digital to analog control port (d2*a*). The driver circuit unit 20 outputs the pixel display driver signal with the first pixel display positive voltage value to the first pixel electrode for the time when the driver circuit unit 20 receives a (the first display voltage duty number+the half duty count+1)$^{th}$ counting signal to a (2-folds the half duty count)$^{th}$ counting signal outputted from the digital to analog control port (d2*a*). Moreover, the driver circuit unit 20 outputs the pixel display driver signal with the first pixel display negative voltage value to the first pixel electrode for the time when the driver circuit unit 20 receives a (2-folds the half duty count+1)$^{th}$ counting signal to a (2-folds the half duty count+the first display voltage duty number)$^{th}$ counting signal outputted from the digital to analog control port (d2*a*). The driver circuit unit 20 outputs the pixel display driver signal with the second pixel display negative voltage value to the first pixel electrode for the time when the driver circuit unit 20 receives a (2-folds the half duty count+the first display voltage duty number+1)$^{th}$ counting signal to a (3-folds the half duty count+the first display voltage duty number)$^{th}$ counting signal outputted from the digital to analog control port (d2*a*). The driver circuit unit 20 outputs the pixel display driver signal with the first pixel display negative voltage value to the first pixel electrode for the time when the driver circuit unit receives a (3-folds the half duty count+the first display voltage duty number+1)$^{th}$ counting signal to a (4-folds the half duty count)$^{th}$ counting signal outputted from the digital to analog control port (d2*a*).

For example, the half duty count is configured to be an integer of 6. As shown for the first pixel electrode clearance information 1141, the first clearance voltage duty number is 110. As shown for the second pixel electrode clearance information 1142, the second clearance voltage duty number is 110. As shown for the first pixel clearance positive voltage value 1131*a*, the first pixel clearance positive voltage value is the first voltage V1, i.e. 001. As shown for the second pixel clearance positive voltage value 1131*b*, the second pixel clearance positive voltage value is the first voltage V1, i.e. 001. As shown for the first pixel clearance negative voltage value 1132*a*, the first pixel clearance negative voltage value is the fourth voltage V4, i.e. 100. As shown for the second pixel clearance negative voltage value 1132*b*, the second pixel clearance negative voltage value is the fourth voltage V4, i.e. 100. As shown for the first pixel electrode display information 1121, the first display voltage duty number is 110. As shown for the second pixel electrode display information 1122, the second display voltage duty number is 000. As shown for the first pixel display positive voltage value 1111*a*, the first pixel display positive voltage value is the second voltage V2, i.e. 010. As shown for the second pixel display positive voltage value 1111*b*, the second pixel display positive voltage value is the third voltage V3, i.e. 011. As shown for the first pixel display negative voltage value 1112*a*, the first pixel display negative voltage value is the fifth voltage V5, i.e. 101. As shown for the second pixel display negative voltage value 1112*b*, the second pixel display negative voltage value is the sixth voltage V6, i.e. 110.

With further reference to FIGS. 14A to 14C, according to the bits-to-value conversion table, as the first clearance voltage duty number is 110, the driver circuit unit 20 outputs the pixel clearance driver signal with the first pixel clearance positive voltage value, i.e. the first voltage V1, to the first pixel electrode for the first clearance time duration of 6 clocks of duty time. For this reason, the driver circuit unit 20 outputs the pixel clearance driver signal with the first pixel clearance positive voltage value, i.e. the first voltage V1, to the first pixel electrode for the time when the driver circuit unit 20 receives a $1^{st}$ to a $6^{th}$ counting signal 102 outputted from the digital to analog control port (d2*a*). Moreover, the driver circuit unit 20 outputs the pixel clearance driver signal with the second pixel clearance positive voltage value to the first pixel electrode for the time when the driver circuit unit 20 receives a (the first clearance voltage duty number+1)$^{th}$ to a (2-folds the half duty count)$^{th}$ counting signal 102 outputted from the digital to analog control port (d2*a*).

As the driver circuit unit 20 enters the negative half cycle, the driver circuit unit 20 outputs the pixel clearance driver signal with the first pixel clearance negative voltage value, i.e. the fourth voltage V4, to the first pixel electrode for the time when the driver circuit unit 20 receives a (2-folds the half duty count+1)$^{th}$ to a (2-folds the half duty count+the first clearance voltage duty number)$^{th}$ counting signal 102 outputted from the digital to analog control port (d2*a*). Moreover, the driver circuit unit 20 outputs the pixel clearance driver signal with the second pixel clearance negative voltage value to the first pixel electrode for the time when the driver circuit unit 20 receives a (2-folds the half duty count+the first clearance voltage duty number+1)$^{th}$ to a (4-folds the half duty count)$^{th}$ counting signal 102 outputted from the digital to analog control port (d2*a*).

The driver circuit unit 20 outputs the pixel clearance driver signal to the second pixel electrode following a similar logic to the above mentioned way of outputting the pixel clearance driver signal to the first pixel electrode, and therefore, further description of the driver circuit unit 20 outputting the pixel clearance driver signal to the second pixel electrode is omitted.

As the first display voltage duty number is 110, the driver circuit unit 20 outputs the pixel display driver signal with the first pixel display positive voltage value, i.e. the second voltage V2, to the first pixel electrode for the first display time duration of 6 clocks of duty time. For this reason, the driver circuit unit 20 outputs the pixel display driver signal with the first pixel display positive voltage value, i.e. the second voltage V2, to the first pixel electrode for the time when the driver circuit unit 20 receives a $1^{st}$ to a $6^{th}$ counting signal 102 outputted from the digital to analog control port (d2*a*). Moreover, the driver circuit unit 20 outputs the pixel display driver signal with the second pixel display positive voltage value, i.e. the third voltage V3, to the first pixel electrode for the time when the driver circuit unit 20 receives a $7^{th}$ to a $12^{th}$ counting signal 102 outputted from the digital to analog control port (d2*a*). Since the first display voltage duty number of 110 corresponds to a value of 6 according to the bits-to-value conversion table, the driver circuit unit 20 should output the pixel display driver signal with the first pixel display positive voltage value to the first pixel electrode for the time when the driver circuit unit 20 receives a (the first display voltage duty number+the half duty count+1)$^{th}$ counting signal to a (2-folds the half duty count)$^{th}$ counting signal outputted from the digital to analog control port (d2$a$). In other words, the driver circuit unit 20 logically should output the pixel display driver signal with the first pixel display positive voltage value, i.e. the second voltage V2, to the first pixel electrode for the time when the driver circuit unit 20 receives a 13$^{th}$ to a 12$^{th}$ counting signal 102. However, since a time duration of the 13$^{th}$ to the 12$^{th}$ counting signals 102 is logically non-existent, when the first display voltage duty number is configured as 110, the driver circuit unit 20 refrains from outputting the pixel display driver signal with the first pixel display positive voltage value once more to the first pixel electrode.

As the driver circuit unit 20 enters the negative half cycle, the driver circuit unit 20 outputs the pixel display driver signal with the first pixel display negative voltage value, i.e. the fifth voltage V5, to the first pixel electrode for the time when the driver circuit unit 20 receives a 13$^{th}$ to an 18$^{th}$ counting signal 102 outputted from the digital to analog control port (d2$a$). Moreover, the driver circuit unit 20 outputs the pixel display driver signal with the second pixel display negative voltage value, i.e. the sixth voltage V6, to the first pixel electrode for the time when the driver circuit unit 20 receives a 19$^{th}$ to a 24$^{th}$ counting signal 102 outputted from the digital to analog control port (d2$a$). Since the first display voltage duty number is configured as 110, for similar reasons previously mentioned, the driver circuit unit 20 refrains from outputting the pixel display driver signal with the first pixel display negative voltage value once more to the first pixel electrode.

With similar logics, as the second display voltage duty number is 000, the driver circuit unit 20 should output the pixel display driver signal with the first pixel display positive voltage value, i.e. the second voltage V2, to the second pixel electrode for the time when the driver circuit unit 20 receives a 1$^{st}$ to a 0$^{th}$ counting signal 102 outputted from the digital to analog control port (d2$a$). However, since a time duration of the 1$^{st}$ to the 0$^{th}$ counting signals 102 is logically non-existent, when the second display voltage duty number is configured as 000, the driver circuit unit 20 refrains from first outputting the pixel display driver signal with the first pixel display positive voltage value to the second pixel electrode. Moreover, the driver circuit unit 20 outputs the pixel display driver signal with the second pixel display positive voltage value, i.e. the third voltage V3, to the second pixel electrode for the time when the driver circuit unit 20 receives the 1$^{st}$ to 6$^{th}$ counting signals 102 outputted from the digital to analog control port (d2$a$). The driver circuit unit 20 outputs the pixel display driver signal with the first pixel display positive voltage value, i.e. the second voltage V2, to the second pixel electrode when the driver circuit unit 20 receives a 7$^{th}$ to a 12$^{th}$ counting signal 102 outputted from the digital to analog control port (d2$a$).

As the driver circuit unit 20 enters the negative half cycle, since the second display voltage duty number is configured as 000, according to the aforementioned logics, the driver circuit unit 20 refrains from first outputting the pixel display driver signal with the first pixel display negative voltage value, i.e. the fifth voltage V5, to the second pixel electrode. Moreover, the driver circuit unit 20 outputs the pixel display driver signal with the second pixel display negative voltage value, i.e. the sixth voltage V6, to the second pixel electrode for the time when the driver circuit unit 20 receives a 13$^{th}$ to an 18$^{th}$ counting signal 102 outputted from the digital to analog control port (d2$a$). The driver circuit unit 20 outputs the pixel display driver signal with the first pixel display negative voltage value, i.e. the fifth voltage V5, to the second pixel electrode for the time when the driver circuit unit 20 receives a 19$^{th}$ to a 24$^{th}$ counting signal 102 outputted from the digital to analog control port (d2$a$).

With reference to FIGS. 14A and 14B, FIG. 14A presents a waveform perspective view of a pixel display driver signal waveform 201 outputted from the driver circuit unit 20 to the first pixel electrode, and FIG. 14B presents a waveform perspective view of a pixel display driver signal waveform 202 outputted from the driver circuit unit 20 to the second pixel electrode.

In an example, the multistable display driven by DDS is configured to display Full HD resolution of 1920×1080. When using single data rate (SDR) for transporting data, each cycle of the clock signal is able to include and transport data for one pixel, thus in other words, the pixel per clock is 1. Furthermore, a transportation time ($T_{line}$) for each frame is configured to be 5 milliseconds (ms).

A clock rate of the multistable display driven by DDS is calculated with the following formula:

$$\text{clock rate (Hz)} = \frac{\text{(resolution)}}{\text{(piexl per clock)}} \times \frac{1}{(T_{line})}$$

More particularly, when the resolution is 1920, the pixel per clock under SDR is 1, the transportation time ($T_{line}$) is configured as 5 ms, and the clock rate is obtained as shown in the following Table 4:

TABLE 4

| Resolution | Mode | Pixel per clock | Duty count | $T_{line}$ | Clock rate |
|---|---|---|---|---|---|
| Full HD (1920 × 1080) | SDR | 1 | 64 | 5(ms) | 384.8(kHz) |

Comparing Table 1 and Table 4, the clock rate of the multistable display driven by DDS is lower than a clock rate of the conventional multistable display, and thus the multistable display of the present invention is able to decrease power consumption.

Overall, as clock rate and duty count are independent from each other in the present invention, the clock rate of the multistable display driven by DDS, under a same condition of having $T_{line}$=5 ms, is significantly reduced to kHz levels. In other words, the multistable display driven by DDS of the present invention is able to be driven at a low clock rate, thus allowing the multistable display of the present invention to reduce its power consumption rate.

Furthermore, to configure all voltages and voltage waveforms needed across multiple duty cycles for updating a frame, the multistable display of the present invention merely requires to transport data once, instead of needing to transport data multiple times for configuring various voltages across different duty cycles. In other words, by transporting the pixel dynamic display header data 111 and the pixel dynamic display waveform data 112 in the data signal 11 at once, the time controller circuit unit 10 is able to instruct the driver circuit unit 20 to configure all voltages and voltage waveforms needed across multiple duty cycles for updating a frame. Each of the display start pulse control ports (dsp) only needs to output for one duty cycle, instead of needing to output for multiple duty cycles for configuring all voltages and voltage waveforms needed across multiple duty cycles for updating a frame. As such, the present invention drastically decreases a number of times, or duty cycles, the display start pulse control ports (dsp) needed to output signals, thus decreasing a power consumption for dynamically switching voltages being output by the display start pulse control ports (dsp).

Furthermore, since the counting signals 102 outputted from the digital to analog control port (d2*a*) are utilized for calculations, during a hold time of the digital to analog control port (d2*a*) outputting the counting signals 102, the at least one data signal output port would still be able to transport data and stay unaffected by signal conversions between digital signals and analog signals, thus, preventing data bubble from forming. In other words, during a hold time of the digital to analog control port (d2*a*) outputting the counting signals 102, the data signal output port (data 0) continues to transport data, and as the data transmission is continuous without stopping, data bubble is prevented from forming. As a result, the present invention is able to more efficiently transport data for updating a frame.

As the counting signals 102 outputted from the digital to analog control port (d2*a*) are utilized for calculations, waveform data for a first frame is required to finish its data transportation before a first counting signal arrives, i.e. before the counting signals 102 rise to a higher voltage level for the first time. Subsequently, a next frame's waveform data may be transported during a time period from an arrival of the second counting signal to an arrival of the $n^{th}$ counting signal. The next frame's waveform data should finish its data transportation before an $(n+1)^{th}$ counting signal arrives. For example, suppose that a frame's voltage waveform occupies 4 duties, the at least one data signal output port needs to finish transporting a first frame's voltage waveform before the first counting signal arrives with a rise of voltage level. Subsequently, a second frame's voltage waveform may be transported during the time period from the arrival of a second counting signal to the arrival of a fourth counting signal, and the second frame's voltage waveform should finish its data transportation before a fifth counting signal arrives. A buffer time may be included between transporting waveform data of two consecutive frames, and thus, meaning the transporting of the waveform data of two consecutive frames is free to be spaced apart by the buffer time, instead of being forced to be bundled together during data transportation. As such, the present invention provides and ensures great flexibility for sequencing the transportation of the waveform data of two consecutive frames.

A plurality of digital to analog control ports (d2*a*) of a conventional multistable display are utilized to output signals for digital to analog conversion. For updating a frame, within each duty, the digital to analog control ports (d2*a*) of the conventional multistable display are required to output signals for a cycle, and only when the digital to analog control ports (d2*a*) outputted the signals for a cycle would the at least one data signal output port output a waveform data for a next duty. This process is repeated until a last duty's waveform data is outputted. Furthermore, once the last duty's waveform data is outputted for updating a last frame, the digital to analog control ports (d2*a*) are further required to output for one more cycle of signals, and only then would the at least one data signal output port stop outputting the waveform data. In other words, the at least one data signal output port of the conventional multistable display would only stop outputting waveform data after the digital to analog control ports (d2*a*) of the conventional multistable display have outputted the last signals.

However, the multistable display driven by DDS of the present invention is different. The counting signals 102 outputted by the digital to analog control port (d2*a*) of the present invention are utilized for counting, and the at least one data signal output port of the present invention only needs to finish transporting the waveform data before the first counting signal arrives with a rising voltage. As a result, once the waveform data for the last frame is outputted, the at least one data signal output port of the present invention no longer needs to output more waveform data. In other words, once the waveform data for the last frame is outputted, for a time duration of the digital to analog control port (d2*a*) of the present invention outputting the counting signals 102, the at least one data signal output port no longer needs to output more waveform data. For example, suppose that a last frame's voltage waveform occupies 4 duties, the at least one data signal output port needs to finish transporting the last frame's voltage waveform before the first counting signal arrives with a rise of voltage level. For a time duration of the digital to analog control port (d2*a*) of the present invention outputting the first counting signal to the fourth counting signal for the last frame, the at least one data signal output port no longer needs to output more waveform data.

Furthermore, according to the aforementioned embodiments, the driver circuit unit 20 determines the pixel display voltage value of the pixel display driver signal outputted from the driver circuit unit 20 to the screen unit 30 according to the pixel dynamic display header data 111, and the driver circuit unit 20 also determines the pixel display driving time duration for outputting the pixel display driver signal with the pixel display voltage value from the driver circuit unit 20 to the screen unit 30 according to the half duty count and the pixel dynamic display waveform data 112. More particularly, when the driver circuit unit 20 determines the pixel display driving time duration for outputting the pixel display driver signal with the pixel display voltage value according to the half duty count and the pixel dynamic display waveform data 112, the driver circuit unit 20 determines the display voltage duty number according to the pixel dynamic display waveform data 112, then the driver circuit unit 20 configures: the first display time duration for outputting the first pixel display positive voltage value according to the display voltage duty number; the second display time duration for outputting the second pixel display positive voltage value according to the half duty count; the third display time duration for once more outputting the first pixel display positive voltage value according to the half duty count minus the display voltage duty number. Applying the aforementioned logic regarding a positive half cycle to the negative half cycle, the driver circuit unit 20 is able to configure the fourth display time duration for outputting the first pixel display negative voltage value, the fifth display time duration for outputting the second pixel display negative voltage value, and the sixth display time duration for once more outputting the first pixel display negative voltage value. In other words, the pixel dynamic display waveform data 112 corresponds to hold time for each voltage value. As the driver circuit unit 20 receives the pixel dynamic display waveform data 112, the driver circuit unit 20 counts the number of counting signals 102 outputted from the digital to analog control port (d2*a*) according to the pixel dynamic display waveform data 112 for calculating the pixel display driving time duration for outputting the pixel display driver signal with the pixel display voltage value. As a result, the driver circuit unit 20 is able to determine entire waveforms of the pixel display driver signal for each of the pixels by only obtaining the pixel dynamic display waveform data 112, and thus, the present invention drastically decreases an amount of data needed to be transported for updating a frame.

Furthermore, since the time controller circuit unit 10 only starts outputting signals from the display start pulse control ports (dsp), for controlling the driver circuit unit 20 to output the line driving signals, when the time controller circuit unit 10 finishes outputting the pixel clearance header data and the pixel clearance waveform data, the time controller circuit unit 10 does not need to provide any additional data to the driver circuit unit 20 during a time when the driver circuit unit 20 is outputting the pixel clearance positive voltage information and the pixel clearance negative voltage information.

Figure 15:
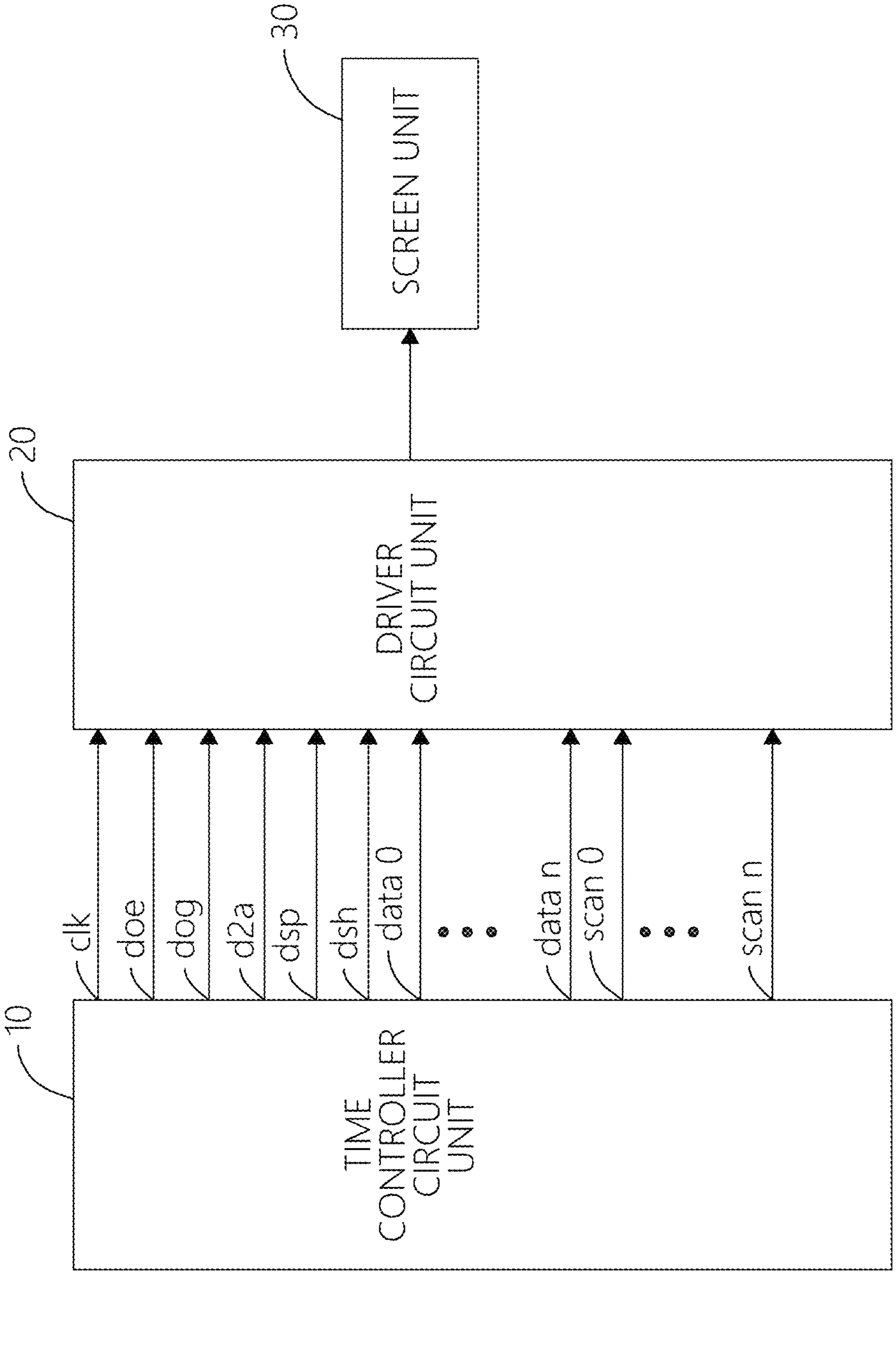
FIG. 15 is another block diagram of the multistable display of the present invention.

With reference to FIG. 15, the time controller circuit unit 10 further includes at least one scanning output port. In other embodiments, the at least one scanning output port of the time controller circuit unit 10 may include a plurality of scanning output ports (scan 0 to scan n), such as the first scanning output port (scan 0) to the $(n+1)^{th}$ scanning output port (scan n), wherein n is free to be any positive integer. In the present embodiment, the time controller circuit unit 10 includes the first scanning output port (scan 0) to the third scanning output port (scan 2).

Figure 16A:
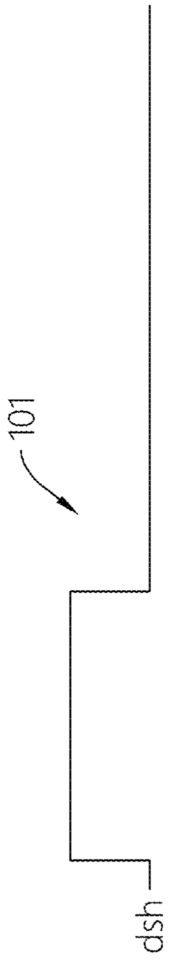
FIG. 16A is a waveform perspective view of the header configuration signal outputted by the header configuration control port (dsh) of the multistable display of the present invention.
Figure 16B:
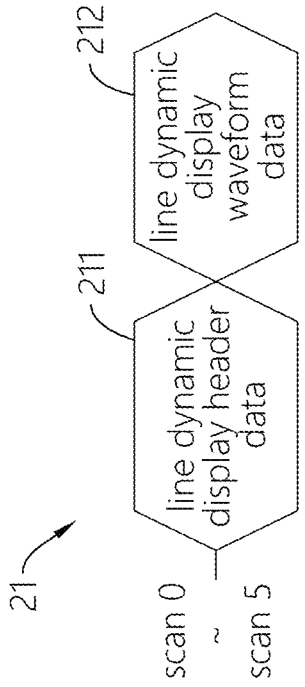
FIG. 16B is a perspective view of a scan signal outputted by a scan signal output port of the multistable display of the present invention.
Figure 16C:
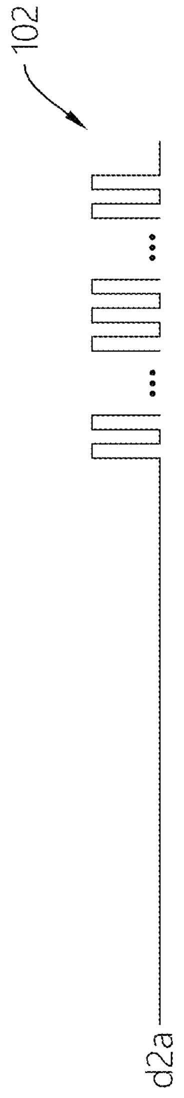
FIG. 16C is a perspective view of the conversion control signal outputted by the digital to analog control port (d2*a*) of the multistable display of the present invention.

With reference to FIGS. 16A to 16C, the time controller signal includes a scan signal 21, and the scan signal 21 includes a line dynamic display header data 211 and a line dynamic display waveform data 212. Before the driver circuit unit 20 outputs a line driving signal to the screen unit 30, the driver circuit unit 20 determines a line driving voltage value of the line driving signal according to the line dynamic display header data 211, and the driver circuit unit 20 also determines a waveform of the line driving signal according to the line driving voltage value and the line dynamic display waveform data 212.

Figure 17A:
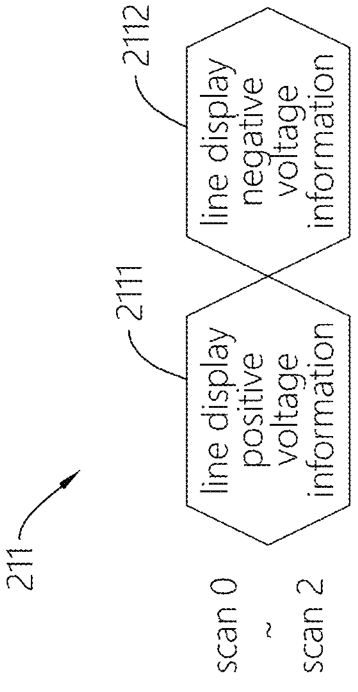
FIG. 17A is a perspective view of a line dynamic display header data of the scan signal outputted by the scan signal output port of the multistable display of the present invention.
Figure 17B:
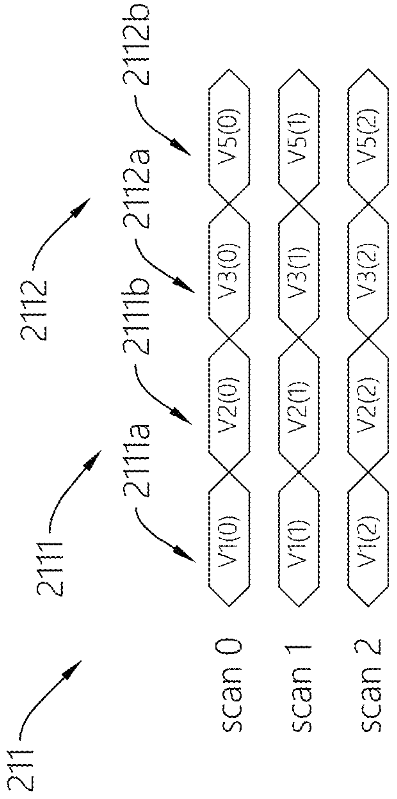
FIG. 17B is a perspective view of the line dynamic display header data of the scan signal outputted by first to third scanning output ports (scan 0 to scan 2) of the multistable display of the present invention.
Figure 19:
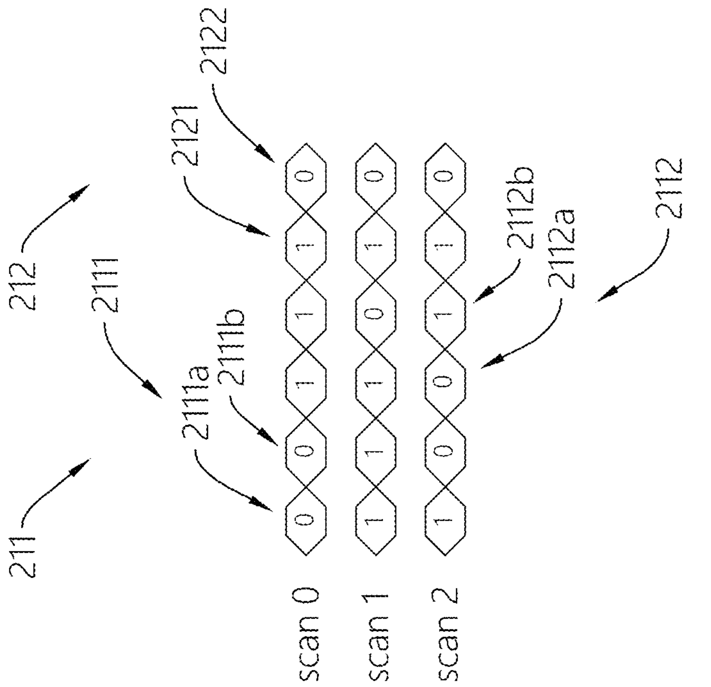
FIG. 19 is a perspective view of the scan signal outputted by the first to third scanning output ports (scan 0 to scan 2) of the multistable display of the present invention.

With reference to FIGS. 17A and 17B, for example, the line dynamic display header data 211 at least includes a line display positive voltage information 2111 and a line display negative voltage information 2112. In the present embodiment, the time controller circuit unit 10 includes the first scanning output port (scan 0) to the third scanning output port (scan 2). The line display positive voltage information 2111 includes a first line display positive voltage value 2111*a* and a second line display positive voltage value 2111*b*. The first line display positive voltage value 2111*a* is a combination of data from the first scanning output port (scan 0) to the third scanning output port (scan 2), i.e. V6(0) to V6(2) that corresponds to the sixth voltage V6. For example, with reference to FIG. 19, the first line display positive voltage value 2111*a* is 110. Similarly, the second line display positive voltage value 2111*b* is represented as V2(0) to V2(2) which corresponds to the second voltage V2. For example, with reference to FIG. 19, the second line display positive voltage value 2111*b* is 010. The line display negative voltage information 2112 includes a first line display negative voltage value 2112*a* and a second line display negative voltage value 2112*b*. The first line display negative voltage value 2112*a* is represented as V3(0) to V3(2) which corresponds to the third voltage V3. For example, with reference to FIG. 19, the first line display negative voltage value 2112*a* is 011. The second line display negative voltage value 2112*b* is represented as V5(0) to V5(2) which corresponds to the fifth voltage V5. For example, with reference to FIG. 19, the second line display negative voltage value 2112*b* is 101.

Figure 18A:
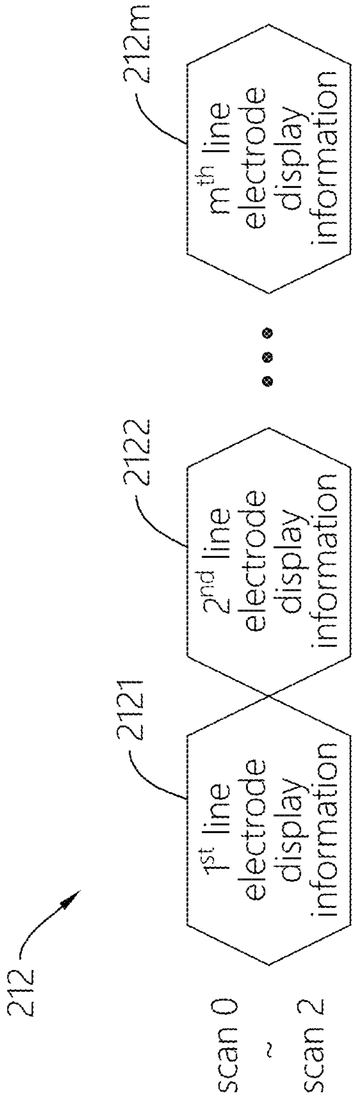
FIG. 18A is a perspective view of a line dynamic display waveform data of the scan signal outputted by the scan signal output port of the multistable display of the present invention.
Figure 18B:
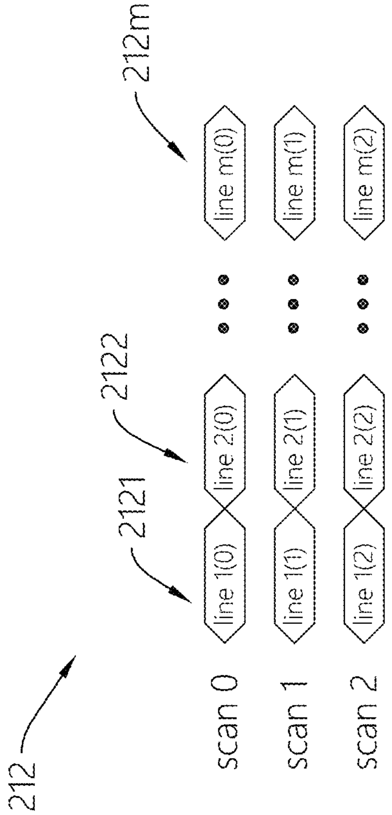
FIG. 18B is a perspective view of the line dynamic display waveform data of the scan signal outputted by the first to third scanning output ports (scan 0 to scan 2) of the multistable display of the present invention.

With reference to FIGS. 18A and 18B, the line dynamic display waveform data 212 includes a plurality of line electrode display information (2121 to 212*m*), and the line electrode display information (2121 to 212*m*) at least includes a first line electrode display information 2121. The first line electrode display information 2121 includes a waveform information of the line driving signal for the first line electrode. The second line electrode display information 2122 includes a waveform information of the line driving signal for the second line electrode. In the present embodiment, the first line electrode display information 2121 is a combination taken from the first to the third scanning output ports (scan 0 to scan 2). For example, with reference to FIG. 19, the first line electrode display information 2121 is 111. The second line electrode display information 2122 is also a combination taken from the first to the third scanning output ports (scan 0 to scan 2). For example, with reference to FIG. 19, the second line electrode display information 2122 is 000.

Figure 20A:
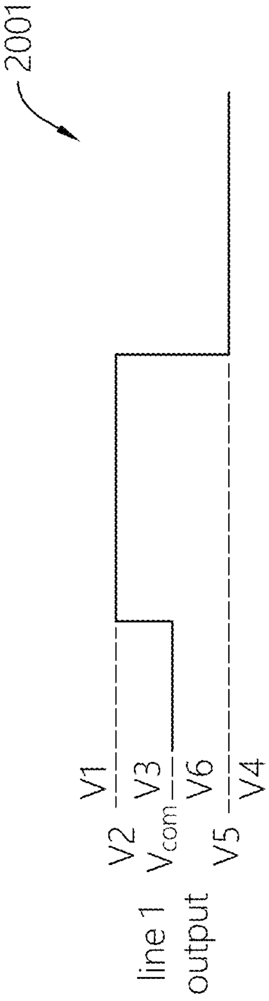
FIG. 20A is a waveform perspective view of the scan signal outputted from the driver circuit unit to a first line electrode in the multistable display of the present invention.
Figure 20B:
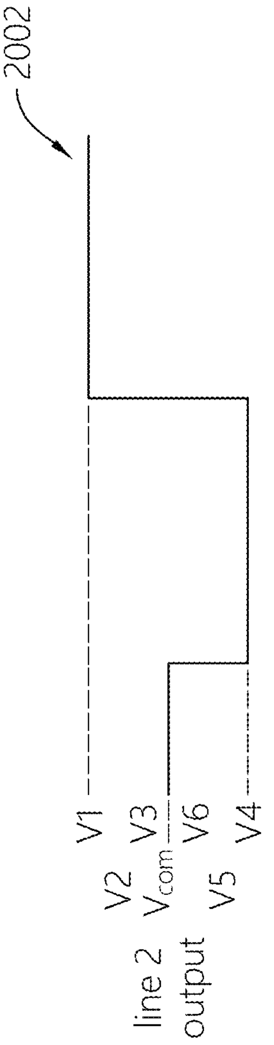
FIG. 20B is a waveform perspective view of the scan signal outputted from the driver circuit unit to a second line electrode in the multistable display of the present invention.
Figure 20C:
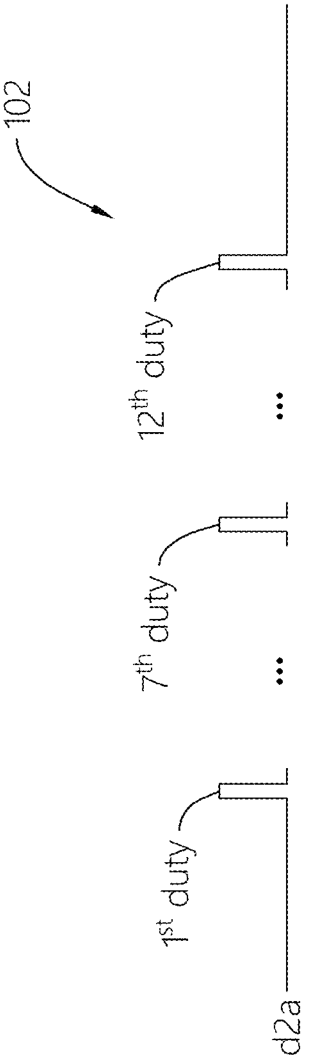
FIG. 20C is a perspective view of the conversion control signal outputted by the digital to analog control port (d2*a*) of the multistable display of the present invention.

With reference to FIGS. 20A to 20C, before the driver circuit unit 20 outputs a line driving signal 2001 to the first line electrode, the driver circuit unit 20 determines a waveform of the line driving signal 2001 according to the first line electrode display information 2121. For example, the first line electrode display information 2121 is 111, and according to the first line electrode display information 2121, the driver circuit unit 20 determines that the waveform of the line driving signal 2001 corresponds to first outputting the second voltage V2 to the first line electrode and then outputting the fifth voltage V5 to the first line electrode, and a time duration for outputting the second voltage V2 to a time duration for outputting the fifth voltage V5 is 1:1. For example, the waveform of the line driving signal 2001 outputted from the driver circuit unit 20 to the screen unit 30 is shown in FIG. 20A. The driver circuit unit 20 outputs the line driving signal with the second voltage V2 to the first line electrode during a time when the digital to analog control port (d2*a*) outputs the $1^{st}$ to the $6^{th}$ counting signals 102, and then the driver circuit unit 20 outputs the line driving signal with the fifth voltage V5 to the first line electrode during a time when the digital to analog control port (d2*a*) outputs the $7^{th}$ to the $12^{th}$ counting signals 102.

Before the driver circuit unit 20 outputs a line driving signal 2002 to the second line electrode, the driver circuit unit 20 determines a waveform of the line driving signal 2002 according to the second line electrode display information 2122. For example, the second line electrode display information 2122 is 000, and according to the second line electrode display information 2122, the driver circuit unit 20 determines that the waveform of the line driving signal 2002 corresponds to first outputting the fourth voltage V4 to the second line electrode and then outputting the first voltage V1 to the second line electrode, and a time duration for outputting the fourth voltage V4 to a time duration for outputting the first voltage V1 is 1:1. For example, the waveform of the line driving signal 2002 outputted from the driver circuit unit 20 to the screen unit 30 is shown in FIG. 20B. The driver circuit unit 20 outputs the line driving signal with the fourth voltage V4 to the second line electrode during a time when the digital to analog control port (d2*a*) outputs the $1^{st}$ to the $6^{th}$ counting signals 102, and then the driver circuit unit 20 outputs the line driving signal with the first voltage V1 to the second line electrode during a time when the digital to analog control port (d2*a*) outputs the $7^{th}$ to the $12^{th}$ counting signals 102.

In an embodiment, the waveform of the line driving signal 2001 outputted from the driver circuit unit 20 to the first line electrode and the waveform of the line driving signal 2002 outputted from the driver circuit unit 20 to the second line electrode are different in time sequence with a delay. For example, a working duty time duration equals 4-folds of the half duty count. The waveform of the line driving signal 2001 outputted from the driver circuit unit 20 to the first line electrode is chronologically sequenced with the following order across multiple working duty time durations: a reset waveform, a first A-type waveform, a second A-type waveform, a first B-type waveform, a first C-type waveform, a second C-type waveform, a third C-type waveform, and at least one blank waveform. The reset waveform, the first A-type waveform, the second A-type waveform, the first B-type waveform, the first C-type waveform, the second C-type waveform, the third C-type waveform, and the blank waveform each respectively occupy one working duty time duration. Furthermore, the waveform of the line driving signal 2001 outputted from the driver circuit unit 20 to the first line electrode and the waveform of the line driving signal 2002 outputted from the driver circuit unit 20 to the second line electrode are relatively delayed with one working duty time duration. For example, when the waveform of the line driving signal 2001 outputted from the driver circuit unit 20 to the first line electrode is showing the second A-type waveform, the first line electrode and the waveform of the line driving signal 2002 outputted from the driver circuit unit 20 to the second line electrode would be showing the first A-type waveform. Similarly, when the waveform of the line driving signal 2001 outputted from the driver circuit unit 20 to the first line electrode is showing the first B-type waveform, the first line electrode and the waveform of the line driving signal 2002 outputted from the driver circuit unit 20 to the second line electrode would be showing the second A-type waveform, etc.

Following this logic, the screen unit 30 may have a $1^{st}$ line electrode and an $L^{th}$ line electrode, wherein L is a positive integer greater than one. The $1^{st}$ line electrode and the $L^{th}$ line electrode are electrically connected to the driver circuit unit 20. When the driver circuit unit 20 outputs an $L^{th}$ line driving signal to the $L^{th}$ line electrode, the waveform of the $L^{th}$ line driving signal outputted from the driver circuit unit 20 to the $L^{th}$ line electrode is delayed in time sequence with (L−1) working duty time durations from a waveform of a $1^{st}$ line driving signal outputted from the driver circuit unit 20 to the $1^{st}$ line electrode. Furthermore, when all of the line electrodes finish displaying at least one of the blank waveforms, in other words, with regards to the aforementioned time delay, when the waveform of the $1^{st}$ line driving signal and the waveform of the $L^{th}$ line driving signal both are blank waveforms, the driver circuit unit 20 thus completes updating all of the line electrodes of the screen unit 30 and completes updating a frame for the screen unit 30.

What is claimed is:

1. A multistable display driven by dynamic display scheme (DDS), comprising:
- a time controller circuit unit, generating a time controller signal;
- a driver circuit unit, connected to the time controller circuit unit, storing a half duty count, and receiving the time controller signal; and
- a screen unit, connected to the time controller circuit unit;
- wherein the time controller signal comprises a data signal, and the data signal comprises a pixel dynamic display header data and a pixel dynamic display waveform data;
- wherein the driver circuit unit determines a pixel display voltage value of a pixel display driver signal according to the pixel dynamic display header data;
- wherein the driver circuit unit determines a pixel display driving time duration according to the half duty count and the pixel dynamic display waveform data, and the driver circuit unit outputs the pixel display driver signal with the pixel display voltage value to the screen unit for the pixel display driving time duration.

2. The multistable display as claimed in claim 1, wherein the data signal further comprises a pixel clearance header data;
- wherein the driver circuit unit determines a pixel clearance driver signal according to the pixel clearance header data, and the driver circuit unit outputs the pixel clearance driver signal to the screen unit.

3. The multistable display as claimed in claim 2, wherein the pixel dynamic display header data comprises a pixel display positive voltage information and a pixel display negative voltage information;
- wherein the pixel display positive voltage information comprises a first pixel display positive voltage value and a second pixel display positive voltage value, and the pixel display negative voltage information comprises a first pixel display negative voltage value and a second pixel display negative voltage value;
- wherein the pixel dynamic display waveform data comprises a plurality of pixel electrode display information, and the plurality of pixel electrode display information at least comprises a first pixel electrode display information, and the first pixel electrode display information comprises a first display voltage duty number;
- wherein the first display voltage duty number and the half duty count are respectively even numbers, and the driver circuit unit calculates a first remaining display voltage duty number by subtracting the first display voltage duty number from the half duty count;
- wherein when the driver circuit unit determines the pixel display driving time duration, for outputting the pixel display driver signal with the pixel display voltage value, according to the half duty count and the pixel dynamic display waveform data,
- the driver circuit unit configures a first display time duration according to the first display voltage duty number of the pixel dynamic display waveform data, and the driver circuit unit outputs the pixel display driver signal with the first pixel display positive voltage value to a first pixel electrode of the screen unit for the first display time duration;
- the driver circuit unit configures a second display time duration according to the half duty count, and the driver circuit unit outputs the pixel display driver signal with the second pixel display positive voltage value to the first pixel electrode for the second display time duration;
- the driver circuit unit configures a third display time duration according to the first remaining display voltage duty number, and the driver circuit unit outputs the pixel display driver signal with the first pixel display positive voltage value to the first pixel electrode for the third display time duration;
- the driver circuit unit configures a fourth display time duration according to the first display voltage duty number of the pixel dynamic display waveform data, and the driver circuit unit outputs the pixel display driver signal with the first pixel display negative voltage value to the first pixel electrode for the fourth display time duration;

the driver circuit unit configures a fifth display time duration according to the half duty count, and the driver circuit unit outputs the pixel display driver signal with the second pixel display negative voltage value to the first pixel electrode for the fifth display time duration; and the driver circuit unit configures a sixth display time duration according to the first remaining display voltage duty number, and the driver circuit unit outputs the pixel display driver signal with the first pixel display negative voltage value to the first pixel electrode for the sixth display time duration.

4. The multistable display as claimed in claim 2, wherein the time controller control circuit unit further comprises:

a digital to analog control port, connected to the driver circuit unit, and outputting a conversion control signal to the driver circuit unit, wherein the conversion control signal comprises a plurality of counting signals;

wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, the plurality of pixel electrode display information at least comprises a first pixel electrode display information, the first pixel electrode display information comprises a first display voltage duty number, and the first display voltage duty number and the half duty count are respectively even numbers;

wherein when the driver circuit unit determines the pixel display driving time duration, for outputting the pixel display driver signal with the pixel display voltage value, according to the half duty count and the pixel dynamic display waveform data, the driver circuit unit outputs the pixel display driver signal with the first pixel display positive voltage value to a first pixel electrode of the screen unit for the time when the driver circuit unit receives a $1^{st}$ counting signal to a $D^{th}$ counting signal outputted from the digital to analog control port;

the driver circuit unit outputs the pixel display driver signal with the second pixel display positive voltage value to the first pixel electrode for the time when the driver circuit unit receives a $(D+1)^{th}$ counting signal to a $(D+B)^{th}$ counting signal outputted from the digital to analog control port;

the driver circuit unit once more outputs the pixel display driver signal with the first pixel display positive voltage value to the first pixel electrode for the time when the driver circuit unit receives a $(D+B+1)^{th}$ counting signal to a $(2B)^{th}$ counting signal outputted from the digital to analog control port;

the driver circuit unit outputs the pixel display driver signal with the first pixel display negative voltage value to the first pixel electrode for the time when the driver circuit unit receives a $(2B+1)^{th}$ counting signal to a $(2B+D)^{th}$ counting signal outputted from the digital to analog control port;

the driver circuit unit outputs the pixel display driver signal with the second pixel display negative voltage value to the first pixel electrode for the time when the driver circuit unit receives a $(2B+D+1)^{th}$ counting signal to a $(3B+D)^{th}$ counting signal outputted from the digital to analog control port; and the driver circuit unit once more outputs the pixel display driver signal with the first pixel display negative voltage value to the first pixel electrode for the time when the driver circuit unit receives a $(3B+D+1)^{th}$ counting signal to a $(4B)^{th}$ counting signal outputted from the digital to analog control port;

wherein B is the first display voltage duty number, and D is the half duty count.

5. The multistable display as claimed in claim 1, wherein the data signal further comprises a pixel clearance header data and a pixel clearance waveform data;

wherein the driver circuit unit determines a pixel clearance voltage value for a pixel clearance driver signal according to the pixel clearance header data, the driver circuit unit determines a pixel clearance driving time duration for outputting the pixel clearance driver signal according to the pixel clearance waveform data, and the driver circuit unit outputs the pixel clearance driver signal with the pixel clearance voltage value for the pixel clearance driving time duration to the screen unit.

6. The multistable display as claimed in claim 3, wherein the pixel clearance header data comprises a pixel clearance positive voltage information and a pixel clearance negative voltage information;

wherein the pixel clearance positive voltage information comprises a first pixel clearance positive voltage value and a second pixel clearance positive voltage value, and the pixel clearance negative voltage information comprises a first pixel clearance negative voltage value and a second pixel clearance negative voltage value;

wherein the pixel clearance waveform data comprises a plurality of pixel electrode clearance information, and the plurality of pixel electrode clearance information at least comprises a first pixel electrode clearance information, and the first pixel electrode clearance information comprises a first clearance voltage duty number;

wherein the first clearance voltage duty number and the half duty count are respectively even numbers, and the driver circuit unit calculates a first remaining clearance voltage duty number by subtracting the first clearance voltage duty number from two-folds the half duty count;

wherein when the driver circuit unit determines the pixel clearance driving time duration, for outputting the pixel clearance driver signal with the pixel clearance voltage value, according to the half duty count and the pixel clearance waveform data;

the driver circuit unit configures a first clearance time duration according to the first clearance voltage duty number of the pixel clearance waveform data, and the driver circuit unit outputs the pixel clearance driver signal with the first pixel clearance positive voltage value to a first pixel electrode of the screen unit for the first clearance time duration;

the driver circuit unit configures a second clearance time duration according to the first remaining clearance voltage duty number, and the driver circuit unit outputs the pixel clearance driver signal with the second pixel clearance positive voltage value to the first pixel electrode for the second clearance time duration;

the driver circuit unit configures a third clearance time duration according to the first clearance voltage duty number, and the driver circuit unit outputs the pixel clearance driver signal with the first pixel clearance negative voltage value to the first pixel electrode for the third clearance time duration; and the driver circuit unit configures a fourth clearance time duration according to the first remaining clearance voltage duty number, and the driver circuit unit outputs the pixel clearance driver signal with the second pixel clearance negative voltage value to the first pixel electrode for the fourth clearance time duration.

7. The multistable display as claimed in claim 5, wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, and the plurality of pixel electrode display information at least comprises a first pixel electrode display information, and the first pixel electrode display information comprises a first display voltage duty number;

wherein the first display voltage duty number and the half duty count are respectively even numbers, and the driver circuit unit calculates a first remaining display voltage duty number by subtracting the first display voltage duty number from the half duty count;

wherein when the driver circuit unit determines the pixel display driving time duration, for outputting the pixel display driver signal with the pixel display voltage value, according to the half duty count and the pixel dynamic display waveform data, the driver circuit unit configures a first display time duration according to the first display voltage duty number of the pixel dynamic display waveform data, and the driver circuit unit outputs the pixel display driver signal with the first pixel display positive voltage value to a first pixel electrode of the screen unit for the first display time duration;

the driver circuit unit configures a second display time duration according to the half duty count, and the driver circuit unit outputs the pixel display driver signal with the second pixel display positive voltage value to the first pixel electrode for the second display time duration;

the driver circuit unit configures a third display time duration according to the first remaining display voltage duty number, and the driver circuit unit outputs the pixel display driver signal with the first pixel display positive voltage value to the first pixel electrode for the third display time duration;

the driver circuit unit configures a fourth display time duration according to the first display voltage duty number of the pixel dynamic display waveform data, and the driver circuit unit outputs the pixel display driver signal with the first pixel display negative voltage value to the first pixel electrode for the fourth display time duration;

the driver circuit unit configures a fifth display time duration according to the half duty count, and the driver circuit unit outputs the pixel display driver signal with the second pixel display negative voltage value to the first pixel electrode for the fifth display time duration; and the driver circuit unit configures a sixth display time duration according to the first remaining display voltage duty number, and the driver circuit unit outputs the pixel display driver signal with the first pixel display negative voltage value to the first pixel electrode for the sixth display time duration.

8. The multistable display as claimed in claim 5, wherein the time controller control circuit unit further comprises:

a digital to analog control port, connected to the driver circuit unit, and outputting a conversion control signal to the driver circuit unit, wherein the conversion control signal comprises a plurality of counting signals;

wherein the pixel clearance header data comprises a pixel clearance positive voltage information and a pixel clearance negative voltage information;

wherein the pixel clearance positive voltage information comprises a first pixel clearance positive voltage value and a second pixel clearance positive voltage value, and the pixel clearance negative voltage information comprises a first pixel clearance negative voltage value and a second pixel clearance negative voltage value;

wherein the pixel clearance waveform data comprises a plurality of pixel electrode clearance information, the plurality of pixel electrode clearance information at least comprises a first pixel electrode clearance information, the first pixel electrode clearance information comprises a first clearance voltage duty number, and the first clearance voltage duty number and the half duty count are respectively even numbers;

wherein when the driver circuit unit determines the pixel clearance driving time duration, for outputting the pixel clearance driver signal with the pixel clearance voltage value, according to the half duty count and the pixel clearance waveform data, the driver circuit unit outputs the pixel clearance driver signal with the first pixel clearance positive voltage value to a first pixel electrode of the screen unit when the driver circuit unit receives a $1^{st}$ counting signal to an $A^{th}$ counting signal outputted from the digital to analog control port;

the driver circuit unit outputs the pixel clearance driver signal with the second pixel clearance positive voltage value to the first pixel electrode for the time when the driver circuit unit receives an $(A+1)^{th}$ counting signal to an $(A+B)^{th}$ counting signal outputted from the digital to analog control port;

the driver circuit unit once more outputs the pixel clearance driver signal with the first pixel clearance positive voltage value to the first pixel electrode for the time when the driver circuit unit receives an $(A+B+1)^{th}$ counting signal to a $(2B)^{th}$ counting signal outputted from the digital to analog control port;

the driver circuit unit outputs the pixel clearance driver signal with the first pixel clearance negative voltage value to the first pixel electrode for the time when the driver circuit unit receives a $(2B+1)^{th}$ counting signal to a $(2B+A)^{th}$ counting signal outputted from the digital to analog control port;

the driver circuit unit outputs the pixel clearance driver signal with the second pixel clearance negative voltage value to the first pixel electrode for the time when the driver circuit unit receives a $(2B+A+1)^{th}$ counting signal to a $(3B+A)^{th}$ counting signal outputted from the digital to analog control port; and the driver circuit unit once more outputs the pixel clearance driver signal with the first pixel clearance negative voltage value to the first pixel electrode for the time when the driver circuit unit receives a $(3B+A+1)^{th}$ counting signal to a $(4B)^{th}$ counting signal outputted from the digital to analog control port;

wherein A is the first clearance voltage duty number, and B is the half duty count.

9. The multistable display as claimed in claim 5, wherein the time controller control circuit unit further comprises:

a digital to analog control port, connected to the driver circuit unit, and outputting a conversion control signal to the driver circuit unit, wherein the conversion control signal comprises a plurality of counting signals;

wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, the plurality of pixel electrode display information at least comprises a first pixel electrode display information, the first pixel electrode display information comprises a first display voltage duty number, and the first display voltage duty number and the half duty count are respectively even numbers;

wherein when the driver circuit unit determines the pixel display driving time duration, for outputting the pixel display driver signal with the pixel display voltage value, according to the half duty count and the pixel dynamic display waveform data, the driver circuit unit outputs the pixel display driver signal with the first pixel display positive voltage value to a first pixel electrode of the screen unit for the time when the driver circuit unit receives a $1^{st}$ counting signal to a $D^{th}$ counting signal outputted from the digital to analog control port;

the driver circuit unit outputs the pixel display driver signal with the second pixel display positive voltage value to the first pixel electrode for the time when the driver circuit unit receives a $(D+1)^{th}$ counting signal to a $(D+B)^{th}$ counting signal outputted from the digital to analog control port;

the driver circuit unit once more outputs the pixel display driver signal with the first pixel display positive voltage value to the first pixel electrode for the time when the driver circuit unit receives a $(D+B+1)^{th}$ counting signal to a $(2B)^{th}$ counting signal outputted from the digital to analog control port;

the driver circuit unit outputs the pixel display driver signal with the first pixel display negative voltage value to the first pixel electrode for the time when the driver circuit unit receives a $(2B+1)^{th}$ counting signal to a $(2B+D)^{th}$ counting signal outputted from the digital to analog control port;

the driver circuit unit outputs the pixel display driver signal with the second pixel display negative voltage value to the first pixel electrode for the time when the driver circuit unit receives a $(2B+D+1)^{th}$ counting signal to a $(3B+D)^{th}$ counting signal outputted from the digital to analog control port; and the driver circuit unit once more outputs the pixel display driver signal with the first pixel display negative voltage value to the first pixel electrode for the time when the driver circuit unit receives a $(3B+D+1)^{th}$ counting signal to a $(4B)^{th}$ counting signal outputted from the digital to analog control port;

wherein B is the first display voltage duty number, and D is the half duty count.

10. The multistable display as claimed in claim 1, wherein the time controller circuit unit comprises:

a header configuration control port, connected to the driver circuit unit, and outputting a header configuration signal to the driver circuit unit; and at least one data signal output port, connected to the driver circuit unit, and outputting the data signal to the driver circuit unit;

wherein when the data signal outputted from the at least one data signal output port is the pixel dynamic display header data, the data signal outputted from the at least one data signal output port is at a high voltage.

11. The multistable display as claimed in claim 10, wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, and the plurality of pixel electrode display information at least comprises a first pixel electrode display information, and the first pixel electrode display information comprises a first display voltage duty number;

wherein the first display voltage duty number and the half duty count are respectively even numbers, and the driver circuit unit calculates a first remaining display voltage duty number by subtracting the first display voltage duty number from the half duty count;

wherein when the driver circuit unit determines the pixel display driving time duration, for outputting the pixel display driver signal with the pixel display voltage value, according to the half duty count and the pixel dynamic display waveform data;

the driver circuit unit configures a first display time duration according to the first display voltage duty number of the pixel dynamic display waveform data, and the driver circuit unit outputs the pixel display driver signal with the first pixel display positive voltage value to a first pixel electrode of the screen unit for the first display time duration;

the driver circuit unit configures a second display time duration according to the half duty count, and the driver circuit unit outputs the pixel display driver signal with the second pixel display positive voltage value to the first pixel electrode for the second display time duration;

the driver circuit unit configures a third display time duration according to the first remaining display voltage duty number, and the driver circuit unit outputs the pixel display driver signal with the first pixel display positive voltage value to the first pixel electrode for the third display time duration;

the driver circuit unit configures a fourth display time duration according to the first display voltage duty number of the pixel dynamic display waveform data, and the driver circuit unit outputs the pixel display driver signal with the first pixel display negative voltage value to the first pixel electrode for the fourth display time duration;

the driver circuit unit configures a fifth display time duration according to the half duty count, and the driver circuit unit outputs the pixel display driver signal with the second pixel display negative voltage value to the first pixel electrode for the fifth display time duration; and the driver circuit unit configures a sixth display time duration according to the first remaining display voltage duty number, and the driver circuit unit outputs the pixel display driver signal with the first pixel display negative voltage value to the first pixel electrode for the sixth display time duration.

12. The multistable display as claimed in claim 10, wherein the time controller control circuit unit further comprises:

a digital to analog control port, connected to the driver circuit unit, and outputting a conversion control signal to the driver circuit unit, wherein the conversion control signal comprises a plurality of counting signals;

wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, the plurality of pixel electrode display information at least comprises a first pixel electrode display information, the first pixel electrode display information comprises a first display voltage duty number, and the first display voltage duty number and the half duty count are respectively even numbers;

wherein when the driver circuit unit determines the pixel display driving time duration, for outputting the pixel display driver signal with the pixel display voltage value, according to the half duty count and the pixel dynamic display waveform data, the driver circuit unit outputs the pixel display driver signal with the first pixel display positive voltage value to a first pixel electrode of the screen unit for the time when the driver circuit unit receives a $1^{st}$ counting signal to a $D^{th}$ counting signal outputted from the digital to analog control port;

the driver circuit unit outputs the pixel display driver signal with the second pixel display positive voltage value to the first pixel electrode for the time when the driver circuit unit receives a $(D+1)^{th}$ counting signal to a $(D+B)^{th}$ counting signal outputted from the digital to analog control port;

the driver circuit unit once more outputs the pixel display driver signal with the first pixel display positive voltage value to the first pixel electrode for the time when the driver circuit unit receives a $(D+B+1)^{th}$ counting signal to a $(2B)^{th}$ counting signal outputted from the digital to analog control port;

the driver circuit unit outputs the pixel display driver signal with the first pixel display negative voltage value to the first pixel electrode for the time when the driver circuit unit receives a $(2B+1)^{th}$ counting signal to a $(2B+D)^{th}$ counting signal outputted from the digital to analog control port;

the driver circuit unit outputs the pixel display driver signal with the second pixel display negative voltage value to the first pixel electrode for the time when the driver circuit unit receives a $(2B+D+1)^{th}$ counting signal to a $(3B+D)^{th}$ counting signal outputted from the digital to analog control port; and the driver circuit unit once more outputs the pixel display driver signal with the first pixel display negative voltage value to the first pixel electrode for the time when the driver circuit unit receives a $(3B+D+1)^{th}$ counting signal to a $(4B)^{th}$ counting signal outputted from the digital to analog control port;

wherein B is the first display voltage duty number, and D is the half duty count.

13. The multistable display as claimed in claim 1, wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, and the plurality of pixel electrode display information at least comprises a first pixel electrode display information, and the first pixel electrode display information comprises a first display voltage duty number;

wherein the first display voltage duty number and the half duty count are respectively even numbers, and the driver circuit unit calculates a first remaining display voltage duty number by subtracting the first display voltage duty number from the half duty count;

wherein when the driver circuit unit determines the pixel display driving time duration, for outputting the pixel display driver signal with the pixel display voltage value, according to the half duty count and the pixel dynamic display waveform data, the driver circuit unit configures a first display time duration according to the first display voltage duty number of the pixel dynamic display waveform data, and the driver circuit unit outputs the pixel display driver signal with the first pixel display positive voltage value to a first pixel electrode of the screen unit for the first display time duration;

the driver circuit unit configures a second display time duration according to the half duty count, and the driver circuit unit outputs the pixel display driver signal with the second pixel display positive voltage value to the first pixel electrode for the second display time duration;

the driver circuit unit configures a third display time duration according to the first remaining display voltage duty number, and the driver circuit unit outputs the pixel display driver signal with the first pixel display positive voltage value to the first pixel electrode for the third display time duration;

the driver circuit unit configures a fourth display time duration according to the first display voltage duty number of the pixel dynamic display waveform data, and the driver circuit unit outputs the pixel display driver signal with the first pixel display negative voltage value to the first pixel electrode for the fourth display time duration;

the driver circuit unit configures a fifth display time duration according to the half duty count, and the driver circuit unit outputs the pixel display driver signal with the second pixel display negative voltage value to the first pixel electrode for the fifth display time duration; and the driver circuit unit configures a sixth display time duration according to the first remaining display voltage duty number, and the driver circuit unit outputs the pixel display driver signal with the first pixel display negative voltage value to the first pixel electrode for the sixth display time duration.

14. The multistable display as claimed in claim 1, wherein the time controller control circuit unit further comprises:

a digital to analog control port, connected to the driver circuit unit, and outputting a conversion control signal to the driver circuit unit, wherein the conversion control signal comprises a plurality of counting signals;

wherein the pixel dynamic display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel dynamic display waveform data comprises a plurality of pixel electrode display information, the plurality of pixel electrode display information at least comprises a first pixel electrode display information, the first pixel electrode display information comprises a first display voltage duty number, and the first display voltage duty number and the half duty count are respectively even numbers;

wherein when the driver circuit unit determines the pixel display driving time duration, for outputting the pixel display driver signal with the pixel display voltage value, according to the half duty count and the pixel dynamic display waveform data, the driver circuit unit outputs the pixel display driver signal with the first pixel display positive voltage value to a first pixel electrode of the screen unit for the time when the driver circuit unit receives a $1^{st}$ counting signal to a $D^{th}$ counting signal outputted from the digital to analog control port;

the driver circuit unit outputs the pixel display driver signal with the second pixel display positive voltage value to the first pixel electrode for the time when the driver circuit unit receives a $(D+1)^{th}$ counting signal to a $(D+B)^{th}$ counting signal outputted from the digital to analog control port;

the driver circuit unit once more outputs the pixel display driver signal with the first pixel display positive voltage value to the first pixel electrode for the time when the driver circuit unit receives a $(D+B+1)^{th}$ counting signal to a $(2B)^{th}$ counting signal outputted from the digital to analog control port;

the driver circuit unit outputs the pixel display driver signal with the first pixel display negative voltage value to the first pixel electrode for the time when the driver circuit unit receives a $(2B+1)^{th}$ counting signal to a $(2B+D)^{th}$ counting signal outputted from the digital to analog control port;

the driver circuit unit outputs the pixel display driver signal with the second pixel display negative voltage value to the first pixel electrode for the time when the driver circuit unit receives a $(2B+D+1)^{th}$ counting signal to a $(3B+D)^{th}$ counting signal outputted from the digital to analog control port; and the driver circuit unit once more outputs the pixel display driver signal with the first pixel display negative voltage value to the first pixel electrode for the time when the driver circuit unit receives a $(3B+D+1)^{th}$ counting signal to a $(4B)^{th}$ counting signal outputted from the digital to analog control port;

wherein B is the first display voltage duty number, and D is the half duty count.

15. The multistable display as claimed in claim 1, wherein the time controller signal comprises a scan signal, and the scan signal comprises a line dynamic display header data and a line dynamic display waveform data;

wherein before the driver circuit unit outputs a line driving signal to the screen unit, the driver circuit unit determines a line driving voltage value of the line driving signal according to the line dynamic display header data, and the driver circuit unit also determines a waveform of the line driving signal according to the line driving voltage value and the line dynamic display waveform data.

16. The multistable display as claimed in claim 1, wherein the screen unit comprises a $1^{st}$ line electrode and an $L^{th}$ line electrode, wherein L is a positive integer greater than one, and the $1^{st}$ line electrode and the $L^{th}$ line electrode are electrically connected to the driver circuit unit;

wherein a working duty time duration equals 4-folds of the half duty count;

wherein a waveform of an $L^{th}$ line driving signal outputted from the driver circuit unit to the $L^{th}$ line electrode is delayed in time sequence with $(L-1)$ working duty time durations from a waveform of a $1^{st}$ line driving signal outputted from the driver circuit unit to the $1^{st}$ line electrode.

* * * * *